(12) United States Patent
Jayakody et al.

(10) Patent No.: US 12,139,277 B2
(45) Date of Patent: Nov. 12, 2024

(54) SATELLITE SYSTEM

(71) Applicant: Zenno Astronautics LTD, Auckland (NZ)

(72) Inventors: Janith Dulanjana Jayakody, Auckland (NZ); Francis Thomas Moynihan Lavey, Auckland (NZ); Maksim Arshavskiy, Auckland (NZ)

(73) Assignee: Zenno Astronautics Limited, Auckland (NZ)

( * ) Notice: Subject to any disclaimer, the term of this patent is extended or adjusted under 35 U.S.C. 154(b) by 0 days.

(21) Appl. No.: 18/667,961

(22) Filed: May 17, 2024

(65) Prior Publication Data

US 2024/0308699 A1   Sep. 19, 2024

Related U.S. Application Data

(63) Continuation of application No. PCT/IB2023/057885, filed on Aug. 3, 2023.

(30) Foreign Application Priority Data

Aug. 5, 2022   (AU) ................................ 2022902205
Feb. 1, 2023   (AU) ................................ 2023900231

(51) Int. Cl.
  *B64G 1/32*   (2006.01)
  *H01F 6/04*   (2006.01)
  *H01F 6/06*   (2006.01)

(52) U.S. Cl.
  CPC ................ *B64G 1/32* (2013.01); *H01F 6/04* (2013.01); *H01F 6/06* (2013.01)

(58) Field of Classification Search
  CPC ................ B64G 1/32; H01F 6/06; H01F 6/04
  See application file for complete search history.

(56) References Cited

U.S. PATENT DOCUMENTS 3,061,239 A   10/1962   Rusk
3,429,524 A   2/1969   Buckingham
(Continued)

FOREIGN PATENT DOCUMENTS

WO   2020170003   8/2020

OTHER PUBLICATIONS

Batista, D. S. et al., "Three-Axial Helmholtz Coil Design and Validation for Aerospace Applications", IEEE Transactions on Aerospace and Electronic Systems, vol. 54, No. 1, doi: 10.1109/TAES.2017.2760560, (Oct. 9, 2017), pp. 392-403, (Feb. 2018), XP011676997.

(Continued)

*Primary Examiner* — Scott Bauer
(74) *Attorney, Agent, or Firm* — Loginov & Associates, PLLC; William A. Loginov

(57) ABSTRACT

A system for generating magnetic fields in one or more axis, the system comprising a primary electromagnet comprising a first coil having a first axis wherein the first coil is formed of a superconductor, a cooling element configured to cool the first coil below the critical temperature of the superconductor, a power source configured to energise the primary and secondary and electromagnets, wherein the primary electromagnet comprises a frame member, and wherein the frame member is suspended from at least one bracket by a thermally insulating structural member and/or a thermally insulating spring.

20 Claims, 37 Drawing Sheets

(56) References Cited

U.S. PATENT DOCUMENTS

| | | | |
|---|---|---|---|
| 4,525,969 A | 7/1985 | Dyar | |
| 5,334,965 A | 8/1994 | Dolgin | |
| 5,446,433 A * | 8/1995 | Laskaris | G01R 33/3815 |
| | | | 62/51.1 |
| 5,651,256 A * | 7/1997 | Herd | H01F 6/04 |
| | | | 62/51.1 |
| 6,371,413 B1 | 4/2002 | Duchon | |
| 9,234,692 B2 * | 1/2016 | Koyanagi | G01R 33/3403 |
| 2010/0085137 A1 * | 4/2010 | Baker | H01F 6/06 |
| | | | 335/216 |
| 2010/0296208 A1 * | 11/2010 | Tekletsadik | H01F 27/06 |
| | | | 361/43 |
| 2014/0312890 A1 * | 10/2014 | Di Lullo | G01N 27/82 |
| | | | 324/240 |
| 2018/0175710 A1 * | 6/2018 | Park | H02K 15/03 |
| 2020/0094996 A1 | 3/2020 | Miyaguchi | |
| 2020/0200444 A1 * | 6/2020 | Duval | H01F 1/015 |
| 2021/0143694 A1 * | 5/2021 | Arndt | H02K 3/527 |
| 2022/0084729 A1 | 3/2022 | Arshavskiy | |

OTHER PUBLICATIONS

Berry, T et al., "Modelling the Thermal Effects of Tumbling on CubeSats Equipped with HTS Coils", TENCON 2021-2021 IEEE Region 10 Conference (Tencon, Auckland, New Zealand, (Dec. 7, 2021), doi:10.1109/TENCON54134.2021.9707304, pp. 157-162, XP034087119.

\* cited by examiner

SATELLITE SYSTEM

RELATED APPLICATIONS

This application is a continuation (371 bypass continuation) of PCT Application Serial No. PCT/IB2023/057885, entitled AN IMPROVED SATELLITE SYSTEM, filed Aug. 3, 2023, which claims priority from Australia Patent Application Serial No. 2023900231, entitled AN IMPROVED SATELLITE SYSTEM, filed Feb. 1, 2023 and Australia Patent Application Serial No. 2022902205, entitled AN IMPROVED SATELLITE SYSTEM, filed Aug. 5, 2022, the teachings of which applications are expressly incorporated herein by reference.

FIELD OF THE INVENTION

The present invention relates to a system for generating magnetic fields in one or more axes. More particularly, but not exclusively, it relates to a magnetic position control system that is for example useful to control a satellite.

BACKGROUND

Superconducting electromagnets such as a high temperature superconducting (HTS) electromagnets are made from coils of superconducting wires. Such electromagnets may be desirable for use in position control of the satellites because in a superconducting state the wires of such electromagnets have zero electrical resistance and therefore can conduct much larger electric currents than ordinary wires, creating an intense magnetic field and can be cheaper to operate in terms of energy consumption. However, such electromagnets need to be cooled below their critical temperature, which is a temperature at which the HTS material changes from the normal resistive state and becomes a superconductor. Solutions to effectively and/or efficiently cool the superconducting electromagnets to enable them to be more widely and effectively used in the satellite environment have not been sufficiently addressed in the past.

One common method of cooling a superconductive electromagnet involves the use of liquid helium as a coolant to cool the superconductive windings of the electromagnet. Typically, both the electromagnet and the coolant are contained inside a thermally insulated container. To keep the helium from boiling away, the container is usually constructed with an outer jacket containing liquid nitrogen. However, such a cooling method is also not desirable for cooling the electromagnets that are configured to be used in satellites due to the extreme conditions in outer space. The use of such an outer jacket containing liquid nitrogen can add significant volume, mass and complexity to the satellite which is not desirable.

Therefore, aspects of effectively cooling the superconducting electromagnets and also maintaining a thermal mass at cryogenic temperature (i.e. below the superconducting critical temperature) have also not been sufficiently addressed in the past, when it comes to the superconducting electromagnets that are configured to be used in satellites.

One or more of the above-mentioned limitations and disadvantages may also apply to other spacecraft(s) using the magnetic field for position control.

OBJECT OF THE INVENTION

It is an object of the present invention to provide a magnetic attitude control system which overcomes or at least partially ameliorates some of the abovementioned limitations or disadvantages, or which at least provides the public with a useful choice.

Alternatively, and/or additionally, it is an object of the present invention to provide a spacecraft which overcomes or at least partially ameliorates some of the abovementioned limitations or disadvantages, or which at least provides the public with a useful choice.

Alternatively, and/or additionally it is an object of the present invention to provide one or more components or parts of a satellite or other spacecraft positioning system such as but not limited to an electromagnetic positioning system which overcomes or at least partially ameliorates some of the abovementioned limitations or disadvantages, or which at least provides the public with a useful choice.

BRIEF DESCRIPTION OF THE INVENTION

In a first aspect, the present invention may broadly reside in a system for generating magnetic fields in one or more axis, the system comprising: a primary electromagnet comprising a first coil having a first axis, a first secondary electromagnet comprising a second coil having a second axis, a second secondary electromagnet comprising a third coil having a third axis, wherein the first, second and third axis are non-parallel, wherein the first, second and third coil are formed of a superconductor, a cooling element configured to cool the first, second and third coils below the critical temperature of the superconductor, a power source configured to energise the primary and secondary and electromagnets.

In a second aspect, the present invention may broadly reside in a system for generating magnetic fields in one or more axis, the system comprising: a primary electromagnet comprising a first coil having a first axis, a first secondary electromagnet comprising a second coil having a second axis, optionally a second secondary electromagnet comprising a third coil having a third axis, wherein the first, second and third axis are non-parallel, wherein the first, second and third coil are formed of a superconductor, a cooling element configured to cool the first, second and third coils below the critical temperature of the superconductor, a power source configured to energise the primary and secondary and electromagnets.

In an embodiment two of the first, second and third axis are orthogonal.

In an embodiment the first, second and third axis are orthogonal.

In an embodiment the first coil is a pancake coil.

In an embodiment the primary electromagnet further comprises a frame member having an inner and outer perimeter, wherein the first coil is wound around the outer perimeter of the frame member.

In an embodiment the secondary electromagnets are mounted to the frame member of the primary electromagnet.

In an embodiment the secondary electromagnets are mounted within the inner perimeter of the frame member.

In an embodiment the secondary electromagnets are positioned inside of the inner perimeter of the frame member.

In an embodiment the secondary electromagnets are positioned inside the footprint of the primary electromagnet.

In an embodiment the secondary electromagnets are not located outside the footprint of the primary electromagnet.

In an embodiment the secondary electromagnets are arranged within the thickness of the primary electromagnet.

In an embodiment the secondary electromagnets do not extend outside of the thickness of the primary electromagnet.

In an embodiment the secondary electromagnets extend in a manner co-planar the plane of the primary electromagnet.

In an embodiment the secondary electromagnets are enveloped within the primary electromagnet.

In an embodiment the secondary electromagnets are each provided in the form of a solenoid.

In an embodiment the system further comprises: a third secondary electromagnet comprising a fourth coil having a fourth axis, and a fourth secondary electromagnet comprising a fifth coil having a fifth axis, wherein the fourth and fifth coil are formed of a superconductor, wherein the cooling element is further configured to cool the fourth and fifth coil below the critical temperature of the superconductor.

In an embodiment the superconductor is a high temperature superconductor, HTS.

In an embodiment the frame member is quadrilateral shaped (preferably rectangular).

In an embodiment the frame member is quadrilateral shaped (preferably rectangular) and each of the secondary electromagnets are mounted parallel to a respective side of the frame member.

In an embodiment the frame member is quadrilateral shaped (preferably rectangular) and each of the secondary electromagnets are mounted parallel to a respective side of the frame member, such that the fourth and fifth axis are parallel to the second and third axis respectively.

In an embodiment the frame member is supported by at least one bracket.

In an embodiment the frame member is suspended from the at least one bracket by thermally insulating structural member, such as a cable or rod.

In an embodiment, the frame member is suspended from the at least one bracket by a thermally insulating dampener, such as a spring.

In an embodiment the thermally insulating structural member is formed from one of metallic or non-metallic material including one or more of polymers, ceramics, composite, glass, Kevlar, stainless steel or quarts.

In an embodiment the frame member is suspended by thermally insulating structural member from a plurality of brackets.

In an embodiment the frame member is suspended by thermally insulating structural member from four brackets, each bracket located towards and supporting a respective corner of the frame member.

In an embodiment the bracket(s) include adjustable tensioning means for adjusting the tension of the insulating structural member.

In an embodiment the adjustable tensioning means comprise a threaded spool about which an end portion of the insulating structural member is wound.

In an embodiment the adjustable tensioning means comprise one or more of a spring-loaded pulley, pinion, roller and worm gear.

In an embodiment the brackets include automatic tensioning means for maintaining the tension of the insulating structural member.

In an embodiment the brackets are formed of a resiliently flexible material and are configured to provided tension to the insulating structural member by their resilience.

In an embodiment the automatic tensioning means comprise a spring-loaded pulley.

In an embodiment the bracket(s) are formed from metallic or non-metallic material including one or more of polymers, ceramics, composite, glass, nylon, aluminium, titanium or PTFE.

In an embodiment the cooling element comprises a thermal linkage in thermal contact with a heat extraction means.

In an embodiment the heat extraction means comprises one of a cryocooler, heat pump, heat exchanger or heat sink.

In an embodiment the heat extraction means is one of a Stirling cryocooler, a pulse tube cryocooler, a pulse tube miniature cryocooler, a Gifford-McMahon cryocooler, a dilution refrigerator, adiabatic demagnetization refrigerator or thermoelectric cooler.

In an embodiment the heat extraction means comprises a pair of cryocoolers arranged in an opposing geometry so as to reduce net vibration during operation.

In an embodiment the thermal linkage is arranged between the heat extraction means and the frame member such that it provides a thermal path between the heat extraction means and each coil of the primary and secondary electromagnets.

In an embodiment the thermal linkage comprises a flexible connector, which may be made from one or more of braided copper, aluminium or graphene.

In an embodiment the power source comprises an electromagnetic flux injection device.

In an embodiment the electromagnetic flux injection device is an electromagnetic flux pump.

In an embodiment the electromagnetic flux pump is contactless.

In an embodiment the system further comprises insulating material arranged to reduce radiative heat transfer between the primary and secondary electromagnets and their surrounding environment.

In a third aspect, the invention may broadly be said to reside in a system for generating magnetic fields in one or more axis, the system comprising: a primary electromagnet comprising a first coil having a first axis wherein the first coil is formed of a superconductor, a cooling element configured to cool the first coil below the critical temperature of the superconductor, a power source configured to energise the primary electromagnet, wherein the primary electromagnet comprises a frame member, and wherein the frame member is suspended from at least one bracket by a thermally insulating structural member.

In an embodiment the thermally insulating structural member is formed from one of metallic or non-metallic material including one or more of polymers, ceramics, composite, glass, Kevlar, stainless steel or quartz.

In an embodiment the frame member is quadrilateral in shape.

In an embodiment the frame member is rectangular.

In an embodiment the frame member is and suspended by thermally insulating structural member from a plurality of brackets In an embodiment the frame member is rectangular and suspended by thermally insulating structural member from four brackets, each bracket located towards and supporting a respective corner of the frame member.

In an embodiment the bracket(s) include adjustable tensioning means for adjusting the tension of the insulating structural member.

In an embodiment the adjustable tensioning means comprise a threaded spool about which an end portion of the insulating structural member is wound.

In an embodiment the adjustable tensioning means comprise one or more of a spring-loaded pulley, pinion, roller and worm gear.

In an embodiment the brackets include automatic tensioning means for maintaining the tension of the insulating structural member.

In an embodiment the brackets are formed of a resiliently flexible material and are configured to provided tension to the insulating structural member by their resilience.

In an embodiment the automatic tensioning means comprise a spring-loaded pulley.

In an embodiment the bracket(s) are formed from metallic or non-metallic material including one or more of polymers, ceramics, composite, glass, nylon, aluminium, titanium or PTFE.

In an embodiment a first secondary electromagnet is mounted to the frame member comprising a second coil having a second axis wherein the second coil is formed of a superconductor,
 wherein the first and second axis are non-parallel,
 wherein the cooling element is further configured to cool the second coil below the critical temperature of the superconductor.

In an embodiment a second secondary electromagnet is mounted to the frame member comprising a third coil having a third axis wherein the third coil is formed of a superconductor,
 wherein the first, second and third axis are non-parallel,
 wherein the cooling element is further configured to cool the third coil below the critical temperature of the superconductor.

In an embodiment two of the first, second and third axis are orthogonal.

In an embodiment the first, second and third axis are orthogonal.

In an embodiment the first coil is a pancake coil.

In an embodiment the frame member has an inner and outer perimeter and the first coil is wound around the outer perimeter of the frame member.

In an embodiment the secondary electromagnets are mounted within the inner perimeter of the frame member.

In an embodiment the secondary electromagnets are each provided in the form of a solenoid.

In an embodiment, there are more than one cooling elements.

In a fifth aspect, the present invention may broadly reside in a method for generating magnetic fields in one or more axis, the method comprising:
 providing a primary electromagnet comprising a first coil having a first axis,
 providing a first secondary electromagnet comprising a second coil having a second axis,
 optionally providing a second secondary electromagnet comprising a third coil having a third axis, wherein the first, second and third axis are non-parallel, wherein the first, second and third coil are formed of a superconductor,
 providing a cooling element and using the electromagnet to cool the first and second coils (and optionally the third coil) below the critical temperature of the superconductor,
 providing a power source and using the power source to energise the primary and secondary and electromagnets.

In a sixth aspect, the invention may broadly reside in a spacecraft or a satellite within which the system as described in any one or more of the statements above is incorporated.

In an embodiment, the satellite or spacecraft is able to have its orientation controlled about one or more axes of rotation using the system as herein before described installed on the satellite or the spacecraft.

In an embodiment, the satellite or spacecraft is able to have its orientation controlled about three axes of rotation using the system as herein before described installed on the satellite or the spacecraft.

In an embodiment that controls orientation about two or more axes of rotation, the at least two axes are not parallel each other.

In an embodiment that controls orientation about three axes of rotation, the three axes are not parallel each other.

In an embodiment, that controls orientation about two or more axes of rotation, the at least two axes are perpendicular each other.

In an embodiment, that controls orientation about three axes of rotation the three axes are orthogonal to each other.

In an embodiment, that controls orientation about three axes of rotation at least two of the three axes are orthogonal to each other.

In an embodiment, the axes correspond to the axes of the electromagnet(s).

In an embodiment, the axes are respectively parallel to the axes of the electromagnet(s).

In a seventh aspect, the invention may broadly reside in a spacecraft or a satellite within which the system as described in any one or more of the statements above is incorporated, wherein the satellite or spacecraft comprises:
 a chassis; and
 a superconducting magnet control system mounted to or within at least a portion of said chassis for position control of said satellite.

In an embodiment, said chassis is a frame member.

In an embodiment, said chassis is the frame member as defined in any of the statements of or relating to any of the above aspects.

In an embodiment, the satellite or spacecraft comprises at least one superconducting electromagnet.

In an embodiment, the at least one superconducting electromagnet comprises or is mounted to at least one cooling element.

In an embodiment said at least one cooling element is the cooling element as defined in any of the statements of or relating to any of the above aspects.

In an embodiment, the at least one superconducting electromagnet is the primary electromagnet as defined in any of the statements of or relating to any of the above aspects.

In an embodiment, the at least one superconducting electromagnet is the first secondary electromagnet as defined in any of the statements of or relating to any of the above aspects.

In an embodiment, the at least one superconducting electromagnet is the second secondary electromagnet as defined in any of the statements of or relating to any of the above aspects.

In an embodiment, the satellite or the spacecraft comprises at least one cryocooler.

In an embodiment, said at least one cryocooler is thermally coupled to said at least one cooling element to cool said at least one superconducting electromagnet or at least one or more components thereof through said at least one cooling element.

In an embodiment, said at least one cryocooler is thermally coupled to said at least one cooling element to cool said at least one superconducting electromagnet or at least one or more components thereof through said at least one cooling element by conduction cooling or by conduction cooling alone.

In an embodiment, said at least one cryocooler is thermally coupled to said at least one cooling element for cooling said at least one cooling element so that when said at least one cooling element is at a lower temperature than said superconducting electromagnet or at least said one or more components thereof, a transfer of heat through said at least one cooling element causes conduction cooling of said superconducting electromagnet or at least said one or more components thereof.

In an embodiment, said at least one cooling element is a cooling plate.

In an embodiment, said at least one cooling element is a metallic or a non-metallic cooling plate.

In an embodiment, said at least one superconducting electromagnet is thermally coupled to said at least one cryocooler with at least one thermal strap.

In an embodiment, said at least one superconducting electromagnet is thermally coupled to said at least one cryocooler with at least one metallic link.

In an embodiment, said at least one cooling element is made of copper.

In an embodiment, said at least one superconducting electromagnet is a High Temperature Superconductor (HTS) electromagnet.

In an embodiment, said at least one HTS electromagnet has at least one permeable core.

In an embodiment, said at least one permeable core has a relative magnetic permeability greater than that of conventional cores such as iron cores.

In an embodiment, said at least one permeable core has a relative magnetic permeability greater than 500.

In an embodiment, said at least one superconducting electromagnet comprises at least one coil, and wherein said at least one cooling plate is in thermal contact with said at least one coil.

In an embodiment, said at least one superconducting electromagnet comprises at least one coil, and wherein said at least one superconducting electromagnet comprises or is mounted to at least two cooling elements that are in thermal contact with said at least one coil, said cooling elements being a top cooling element and a bottom cooling element, wherein said at least one coil is sandwiched between said top cooling elements and said bottom cooling elements.

In an embodiment, said at least one coil is the first coil, the second coil and/or the third coil as defined in any of the statements of or relating to any of the above aspects.

In an embodiment, the top cooling element is a top cooling plate.

In an embodiment, the bottom cooling element is a bottom cooling plate.

In an embodiment, at least one of said top and bottom cooling elements is substantially hexagonal in shape.

In an embodiment, at least one of said top and bottom cooling elements is made from copper.

In an embodiment, at least one of said top and bottom cooling elements is 2 mm in thickness.

In an embodiment, at least one of said top and bottom cooling elements comprises six holes, preferably, six 3 mm holes on 66 mm diameter.

In an embodiment, said superconducting electromagnet comprises two pole pieces with a magnetic field sensor sandwiched between said pole pieces.

In an embodiment, a thermal link is provided between said top and bottom cooling elements to thermally couple said top and bottom cooling elements.

In an embodiment, said at least one coil is an HTS coil based on Yttrium barium copper oxide (YBCO) 2G (second generation).

In an embodiment, said at least one coil is made from approximately 100 m long, 3 mm wide, 50 μm thick tape or wire.

In an embodiment, said at least one coil has 60 mm outer diameter.

In an embodiment, said at least one coil uses approximately 100 m of tape and is dry-wound without inter-turn insulation or is embedded in a matrix with insulation.

In an embodiment, said at least one superconducting electromagnet further comprises a cylindrical magnet bore.

In an embodiment, said cylindrical magnet bore has an outside diameter of about 10 mm and inside diameter of about 8 mm.

In an embodiment, said at least one coil is wrapped around said cylindrical magnet bore.

In an embodiment, said at least one coil is a double pancake coil.

In an embodiment, said double pancake coil is a HTS wire double pancake coil.

In an embodiment, said double pancake coil is a HTS wire double pancake coil, based on Yttrium barium copper oxide (YBCO) 2G (second generation).

In an embodiment, an insulation sheet is provided between said at least one coil and said cooling elements to reduce electrical shorting.

In an embodiment, said insulation sheet is a G10 insulation sheet.

In an embodiment, windings of said at least one coil terminates on a current bus.

In an embodiment, thermal grease is applied to each interface of said at least one superconducting electromagnet that is a thermal interface.

In an embodiment, said at least one superconducting electromagnet comprises at least one yoke plate that is attached to an exterior surface of said at least one of said top and bottom cooling elements.

In an embodiment, said at least one yoke plate is a mild steel yoke plate.

In an embodiment, said at least one yoke plate is a mild steel magnetic yoke plate.

In an embodiment, said at least one yoke plates is screwed or lightly screwed to at least one of said top and bottom cooling elements.

In an embodiment, a securement means is provided to clamp said top and bottom cooling elements securely for thermal contact with said at least one coil.

In an embodiment, said securement means is one or more brackets.

In an embodiment, said one or more brackets are made out of stainless steel.

In an embodiment, said at least one cryocooler is selected from a Stirling cryocooler, a pulse tube tactical cryocooler or a pulse tube miniature tactical cryocooler.

In an embodiment, said superconducting magnet control system further comprises:
at least one power source; and
at least one control device;
said at least one cryocooler being operatively coupled to said at least one control device and to at least one power source, wherein based on a control signal from the control device said at least one cryocooler is configured to derive energy from said at least one power source to cool said at least one superconducting electromagnet or at least one or more components thereof.

In an embodiment said satellite or spacecraft further comprises a set of reaction wheels that is operatively coupled to said at least one power source and said at least one control device.

In an embodiment, said at least one power source, is the power source as defined in any of the statements of or relating to any of the above aspects.

In an embodiment, said set of reaction wheels comprises three reaction wheels.

In an embodiment, said set of reaction wheels are orthogonal to each other.

In an embodiment, said set of reaction wheels derives energy from said at least one power source.

In an embodiment, operation of said set of reaction wheels is controlled by said at least one control device.

In an embodiment, said at least one control device comprises an on-board computer.

In an embodiment, said at least one control device comprises a microprocessor.

In an embodiment, said microprocessor is a programmable microprocessor.

In an embodiment, said at least one control device comprises a control board.

In an embodiment, said at least one control device derives energy from said at least one power source.

In an embodiment, said at least one control device is configured to control at least one of a timing, a magnitude and a polarity of a magnetic field in said at least one superconducting electromagnet.

In an embodiment, said at least one control device is configured to control a timing of said at least one cryocooler to cool said at least one superconducting electromagnet.

In an embodiment, said at least one cryocooler is controlled by said at least one control device to derive energy from said at least one power source to cool said at least one superconducting electromagnet.

In an embodiment, said at least one power source comprises at least one solar panel.

In an embodiment, said at least one power source is a battery.

In an embodiment, said battery is a rechargeable battery.

In an embodiment, said at least one power source is a capacitor.

In an embodiment, said superconducting magnet control system further comprises at least one electromagnetic flux injection device that is operatively coupled to said at least one control device and is configured to derive energy from said at least one power source to energise said at least one superconducting electromagnet.

In an embodiment, said at least one electromagnetic flux injection device is controlled by said at least one control device to derive energy from said at least one power source to energise said at least one superconducting electromagnet.

In an embodiment, said at least one electromagnetic flux injection device is an electromagnetic flux pump.

In an embodiment, said at least one electromagnetic flux pump is a linear flux pump.

In an embodiment, said at least one electromagnetic flux pump is contactless.

In an embodiment, said at least one electromagnetic flux pump comprises a plurality of solenoids.

In an embodiment, said at least one electromagnetic flux pump comprises a plurality of solenoids that are copper solenoids with an iron core, or solenoids each having copper coil with an iron core.

In an embodiment, said iron core of each of said plurality of solenoids extend between a first end portion and a second end portion, each first end portion being attached to a common iron frame, wherein, there is a plurality of cubic pieces of iron and each second end portion being attached to one and independent cubic piece from said plurality of cubic pieces.

In an embodiment, said frame is square or is substantially square in shape having a first side, a second side, a third side and a fourth side, said first side being opposite said third side and said second side being opposite said fourth side.

In an embodiment, said at least one electromagnetic flux pump comprises six solenoids, with said first end portion of said iron core of each of three solenoids being attached to a first side of said frame, and said first end portion of said iron core of each of said remaining three solenoids being attached to said third side of said frame, wherein each of said cubic pieces attached to said second end portions are spaced apart from one another.

In an embodiment, said at least one electromagnetic flux pump is a non-linear flux pump.

In an embodiment, said at least one electromagnetic flux pump comprises permanent magnets.

In an embodiment, said at least one electromagnetic flux pump is located at a distance from said at least one superconducting electromagnet.

In an embodiment, said at least one electromagnet is mounted to the chassis of the satellite or spacecraft but at a distance from said at least one superconducting electromagnet.

In an embodiment, said electromagnetic flux pump is configured to magnetise said at least one coil, said at least one coil being HTS coil or HTS tape.

In an embodiment, said chassis is hollow cubical or hollow cuboid in shape comprising a plurality of walls.

In an embodiment, said at least one superconducting electromagnet is located in at least one of said walls.

In an embodiment, said satellite or spacecraft has a total mass of at least 500 kg or more.

In an embodiment, said satellite or spacecraft has a total mass of less than 500 kg.

In an embodiment, said satellite is a pico-satellite or a nano-satellite.

In an embodiment, said satellite is a CubeSat (a U-class spacecraft) comprising at least one unit.

In an embodiment, said satellite comprises two or more units that are adjacent to each other.

In an embodiment, said chassis comprises a frame structure, said frame structure being formed by four substantially vertical rails that are spaced apart from each other and four substantially horizontal rails that are also spaced apart from each other, said frame structure being a four-sided polygonal shape in cross-section in a plane that is orthogonal to a longitudinal axis of each of said substantially vertical rails, wherein, in said frame structure, each of said four substantially vertical rails is connected to two of the other three substantially vertical rails via two of said substantially horizontal rails that are substantially vertically spaced apart from one another and also are substantially orthogonal to each other.

In an embodiment, said four-sided polygonal shape is a square or a rectangle.

In an embodiment, said substantially vertical rails and said substantially horizontal rails are integrally formed.

In an embodiment, each substantially vertical rail comprises a first end portion and a second end portion and extends longitudinally from said first end portion to said second end portion, and in each substantially vertical rail, one of said substantially horizontal rails is located at or proximal to said first end portion and another one of the substantially horizontal rails is located at or proximal to the second end portion.

In an embodiment, at least a portion of each substantially vertical rail is L-shaped in cross-section in a plane that is orthogonal to a longitudinal axis of that vertical rail.

In an embodiment, each substantially vertical rail comprises a first end portion and second end portion and extends longitudinally from said first end portion to said second end portion, and in each substantially vertical rail, one of said substantially horizontal rails is located at or proximal to said first end portion and another one of the substantially horizontal rails is located at or proximal to said second end portion.

In an embodiment, at least one of said first end portion and said second end portion of each substantially vertical rail comprises a plate member.

In an embodiment, said plate member is integrally formed with said substantially vertical rails.

In an embodiment, said four substantially vertical rails are of same length.

In an embodiment, at least one of said substantially vertical rails have a plurality of spaced apart apertures along its length.

In an embodiment, said plurality of spaced apart apertures are configured to accommodate countersunk screws.

In an embodiment, said four substantially horizontal rails are of same length.

In an embodiment, internal volume of said chassis is cubical or cuboid.

In an embodiment, said chassis is constructed of a material that is rigid.

In an embodiment, said chassis is constructed of 3D-printed titanium.

In an embodiment, said satellite or spacecraft is configured to be used in a magnetic field.

In an embodiment, said magnetic field is a natural magnetic field or an artificial magnetic field.

In an embodiment, said magnetic field is a natural magnetic field of the earth or a celestial body.

In an embodiment, said magnetic field is a magnetic field of at least one another satellite or spacecraft.

In an embodiment, the satellite or the spacecraft is able to have its orientation controlled about at least two axes of rotation using the system as herein before described installed on the satellite or the spacecraft.

In an embodiment, the satellite or spacecraft is able to have its orientation controlled about three axes of rotation using the system as herein before described installed on the satellite or the spacecraft.

In an embodiment, the at least two axes are not parallel each other.

In an embodiment, the three axes are not parallel each other.

In an embodiment, the at least two axes are perpendicular each other.

In an embodiment, the three axes are orthogonal to each other.

In an embodiment, at least two of the three axes are orthogonal to each other.

In an embodiment, the axes correspond to the axes of the electromagnet(s).

In an embodiment, the axes are respectively parallel to the axes of the electromagnet(s).

In an eighth aspect, the invention may broadly reside in a spacecraft or a satellite within which the system as described in any one or more of the statements above is incorporated, wherein the spacecraft or a satellite is the one as disclosed in PCT International Publication number: WO 2020/174378A1.

In a ninth aspect, the invention resides in a satellite or a spacecraft that is able to have its orientation controlled about at least two axes of rotation using the system as herein before described installed on the spacecraft.

In an embodiment, the at least two axes are not parallel each other.

In an embodiment, the at least two axes are perpendicular each other.

In an embodiment, the axes correspond to the axes of the electromagnet(s).

In a tenth aspect, the invention resides in a satellite or a spacecraft that is able to have its orientation controlled about three axes of rotation using the system as herein before described installed on the satellite or the spacecraft.

In an embodiment, the three axes are not parallel each other.

In an embodiment, the three axes are orthogonal to each other.

In an embodiment, at least two of the three axes are orthogonal to each other.

In an embodiment, the axes correspond to the axes of the electromagnet(s).

In the above, one or more statements of or relating to one aspect may equally apply to another aspect(s).

Other aspects of the invention may become apparent from the following description which is given by way of example only and with reference to the accompanying drawings.

In this specification where reference has been made to patent specifications, other external documents, or other sources of information, this is generally for the purpose of providing a context for discussing the features of the invention. Unless specifically stated otherwise, any reference to such external documents is not to be construed as an admission that such documents, or such sources of information, in any jurisdiction, are prior art, or form part of the common general knowledge in the art.

For the purpose of this specification, where method steps are described in sequence, the sequence does not necessarily mean that the steps are to be chronologically ordered in that sequence unless there is no other logical manner of interpreting the sequence.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following description are simply exemplary embodiments of the invention. Hence, specific dimensions and other physical characteristics related to the embodiments disclosed herein are not to be considered as limiting.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references but also other non-specified components or elements. This rationale will also be used when the term 'comprises' or 'comprised' or 'comprising' is used in relation to the apparatus or to one or more steps in a method or process.

As used hereinbefore and hereinafter, the term "and/or" means "and" or "or", or both.

As used hereinbefore and hereinafter, "(s)" following a noun means the plural and/or singular forms of the noun.

When used in a claim and unless stated otherwise, the word 'for' is to be interpreted to mean only 'suitable for', and not for example, specifically 'adapted' or 'configured' for the purpose that is stated.

As used hereinbefore and hereinafter, and unless specifically stated otherwise, the term 'satellite' is to be interpreted to mean an artificial satellite that is a man-made satellite.

As used hereinbefore and hereinafter, and unless specifically stated otherwise, the term 'conduction cooling' is to be interpreted to mean cooling using heat transfer through a conductive element(s) (i.e. cooling element(s)) that is/are in direct contact with the component(s) to be cooled, the conductive element(s) being thermally coupled to the cryocooler(s) for cooling of the conductive element(s), and the term 'conduction cooling' excludes any other alternative cooling technique(s) that is not 'conduction cooling'.

As used hereinbefore and hereinafter, and unless specifically stated otherwise, the term 'position control' is to be interpreted to mean attitude control, altitude control and/or relative position control (i.e. relative position control using a magnetic field of a nearby satellite) of a satellite using an electromagnetic control system of that satellite.

As used hereinbefore and hereinafter, and unless specifically stated otherwise, the term 'cooling element' is to be interpreted to mean a thermally conductive element that is suitable for use in conduction cooling.

It is known that the word 'substantially' can in some instances, be used to broaden the term. It should be stated that, in this specification, use of the word 'substantially' with a term, to define a characterizing feature(s), gets all the benefit (i.e. benefit of any broadening) afforded by the use of the word 'substantially', and also includes within its scope the feature(s) being that term exactly, (without broadening). For example, if a feature is described/defined in the present specification as being 'substantially vertical' then that includes, within its scope, the feature being 'close' to vertical (in so far the word 'substantially' is deemed to broaden the term 'vertical'), and also includes within its scope the feature being 'exactly' vertical.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

The invention will now be described by way of example only and with reference to the drawings in which.

DETAILED DESCRIPTION

In the description below, unless otherwise stated satellite also refers to a satellite system and therefore the words 'satellite' and 'satellite system' may be used interchangeably throughout the specification.

Magnetic propulsion systems are based on the direct interaction of an object's own magnetic field with a non-uniform external magnetic field, for instance, the Earth's geomagnetic field.

The force arising from a dipole-dipole interaction is fundamental to the magnetic propulsion system.

In our solar system, the Sun, as well as a number of other objects, possess a natural magnetic field. Some of these fields, subject to their intensity, can be used for satellite propulsion. Low thrust propulsion is achievable in any, however small, non-uniform external magnetic field. However, strong and dipole-like fields are favourable.

The magnetic field of the Earth is understood comparatively well. Although complex, the geomagnetic field can be well approximated by that of a dipole (Walt, Martin (1994). *Introduction to Geomagnetically Trapped Radiation*. New York, NY: *Cambridge University Press* pp. 29-33 the entirety of which is herein incorporated by reference).

The magnetic propulsion system, at its simplest form, is constituted by a solenoid, hence giving rise to an on-board magnetic dipole.

Figure 1:
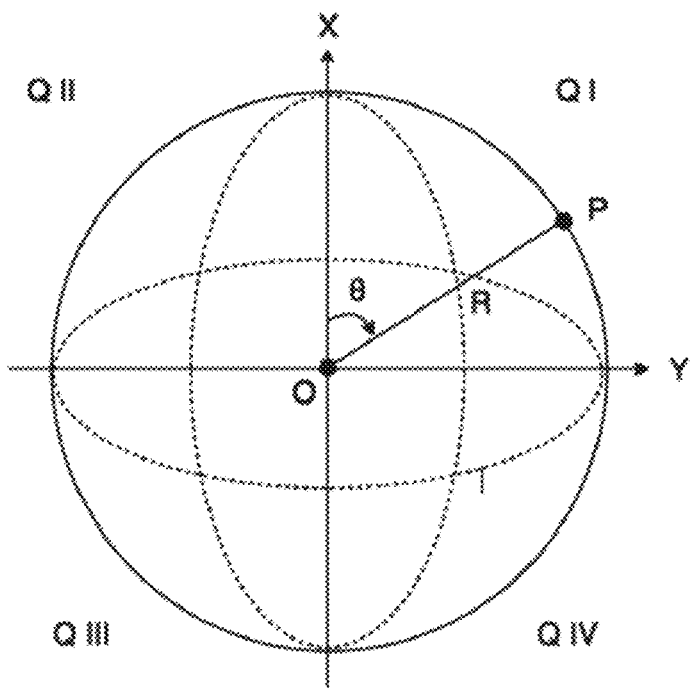
FIG. 1: shows a coordinate system where Points O and P mark the locations of the centres of the magnetic dipoles of the Earth and the on-board magnetic dipole generated by an HTS electromagnet.

The coordinate system is defined in FIG. 1. In FIG. 1, Points O and P mark the locations of the centres of the magnetic dipoles of the Earth and the on-board solenoid (which is coincident with the on-board dipole) respectively.

Dipolar Coupling

The electrodynamic force arising from the dipole-dipole interaction can be represented by two components: radial $F_R$ and tangential $F_\theta$. The magnitude of these components can be numerically estimated by Equations 1 and 2 (Pulatov, V. (2001). Magnetic propulsion systems *Progress in Aerospace Sciences* 37, 245-261, the entirety of which is herein incorporated by reference):

$$F_R = -\frac{3\mu_0 M_E M_P (3\cos^2\theta + 1)^{\frac{1}{2}}}{(4\pi R^4)} \quad (1)$$

$$F_\theta = -3\mu_0 M_E M_P \frac{2\sin(2\theta)}{(3\cos^2\theta + 1)^{\frac{1}{2}}(8\pi R^4)} \quad (2)$$

where $\mu_o$ is the permeability of empty space, R is the distance between the Earth's centre and the centre of the solenoid, $\theta$ is the attitude and, $M_E$ is the magnetic moments of the Earth, and $M_P$ is the propulsion system.

Figure 2:
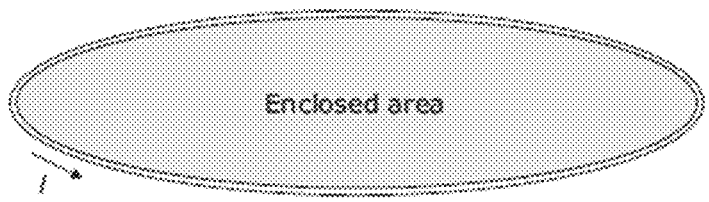
FIG. 2: shows a closed loop and an enclosed area used for magnetic moment calculations.

The magnetic moment of the propulsion system $M_p$ is determined by the properties of the solenoid and its current I, according to Equation 3 below.

$$M_p = \frac{ANI}{L} \quad (3)$$

where A is the area enclosed by the solenoid (see FIG. 2) and N is the number of turns.

Magnetic Moment

At all times, the solenoid is subject to an electrodynamic torque, which is described by Equation 4:

$$\tau = M_P B_0 \sin\alpha \quad (4)$$

where $B_O$ is the magnetic induction vector of the Earth's magnetic field, the angle between vectors $B_O$, and $M_p$ is denoted by $\alpha$. It can be observed that the torque is inexistent when the two vectors are aligned (i.e. $\alpha=0$). This position of perfect alignment can be referred to as an equilibrium position.

The radial force $F_R$ acting on the solenoid in the equilibrium position is directed towards O (the centre of the Earth). However, the direction of the tangential force $F_\theta$ is position-dependent. It is positive (aligned with the velocity) in quarters I and III (see FIG. 1); negative (opposed to the velocity) in quarters II and IV, or vice-versa, depending on the direction of the orbital motion.

Superconductivity

The phenomenon of superconductivity can be utilised to generate a stronger on-board magnetic field at a lower energy cost.

It is evident from Equations 1-3 above that the magnitude of the generated forces is directly proportional to the magnitude of the electric current I. A modern high-temperature superconducting wire can facilitate electric current of up to 540 Amperes/cm. Such current can be maintained in a solenoid for many years with little or no energy input. To preserve these properties, the wire is kept below its threshold superconducting temperature $T_c$, critical current density $J_c$ and magnetic field density $B_c$.

While superconducting temperature threshold $T_c$ is specific to the material choice, other critical values, $J_c$ (critical current density) and $B_c$ (critical magnetic field density), are dependent on the operative temperature as per Equations 5 and 6 (Dadhich, A. & Schaffner, G. (2016). Electromagnetic Propulsion system for spacecrafts using geomagnetic fields and superconductors, San Diego, 4-8 January, the entirety of which is herein incorporated by reference).

$$I_c(T) = I_c(0)\left[1 - \left(\frac{T}{T_c}\right)^2\right] \quad (5)$$

$$B_c(T) = B_c(0)\left[1 - \left(\frac{T}{T_c}\right)^2\right] \quad (6)$$

It is evident that the lower the operating temperature T is, the higher current density $J_c$ and magnetic field $B_c$ can be tolerated by a superconducting wire before its properties vanish.

Electromagnetic control systems can be used for position control of the satellite. The position control may include attitude control, altitude control and/or relative position control (i.e. relative position control using a magnetic field of a nearby satellite). Such satellite would utilise coils of wires attached to it for carrying a current to induce a magnetic field to interact with the magnetic field of Earth or other celestial body(ies) or of a nearby satellite(s), for position control of the satellite in the outer space. The present invention involves the use of a superconductive electromagnet maintained in a temperature region at which superconductivity occurs. Therefore, once a current flow is established in the coil or loop of the electromagnet, the current will continue to flow in the superconducting material requiring little or no additional energy.

It can be appreciated that due to a lack of atmosphere, there is no element that can freeze on a cryocooler in the outer space. Therefore, a cryocooler that is thermally coupled to the electromagnet will be suitable for use in order to keep the electromagnet or the electromagnet coil cold enough to be in the superconducting state.

A small satellite is a satellite of mass that is less or equal to 500 kg.

The desire for greater and sustainable maneuverability is driven by a need for: a controlled de-orbiting from higher orbits; control over satellite orientation for communication or earth observation; synchronisation of satellite positioning in satellite constellations; orbit correction; in-orbit assembly of a complex satellite; close proximity operations etc.

It is desirable to provide maneuverability of satellites such as but not limited small satellites that require a compact but relatively high-field electromagnet. It is desirable to design and build a superconducting electromagnet such as high temperature superconductive (HTS) wire that provides the feasibility of achieving the required magnetic field in the satellite environment.

Several examples/embodiments of or for use in the present invention will now be described.

Figure 3:
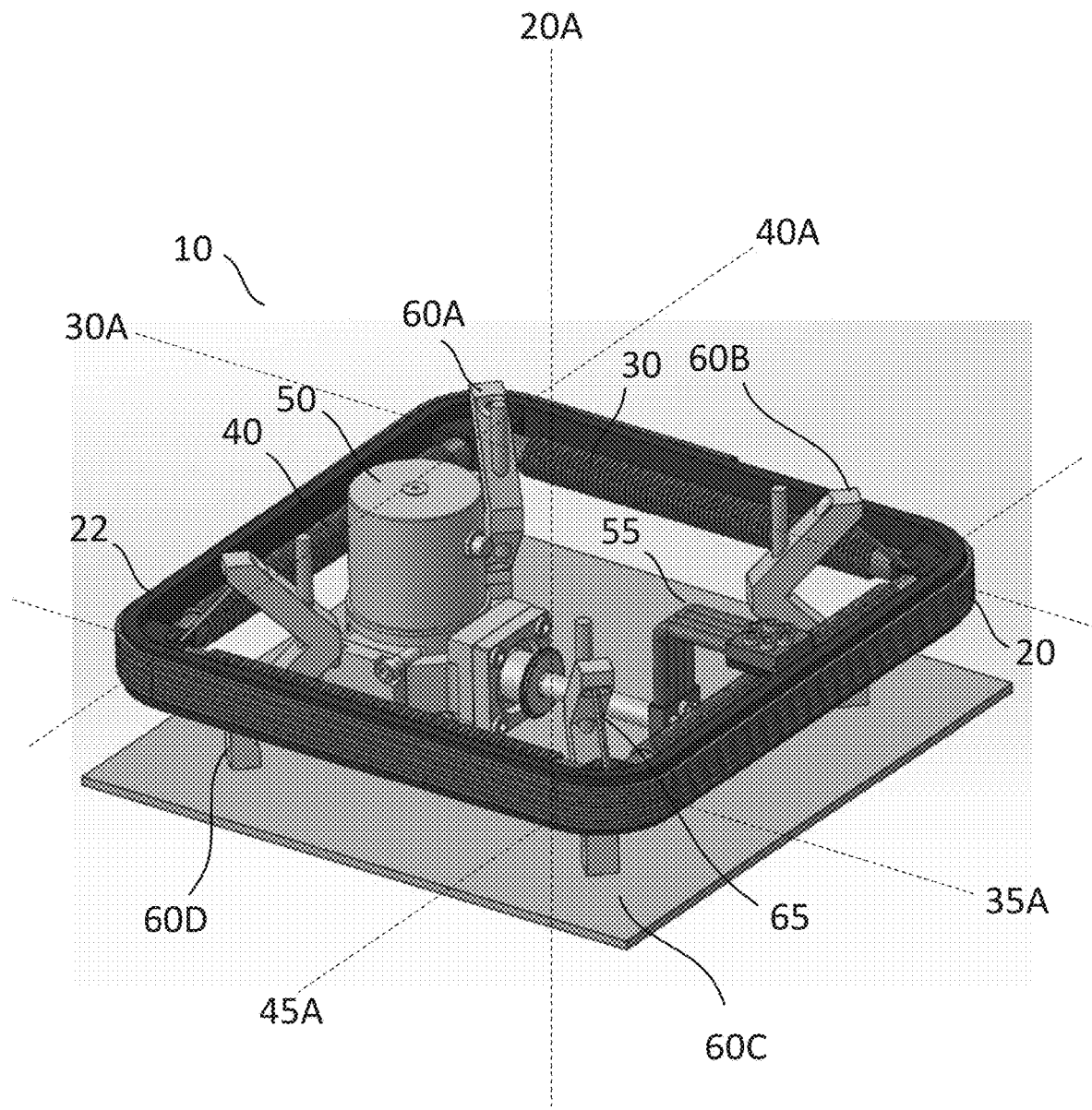
FIG. 3: shows an isometric view of the magnetic attitude adjustment system according to an embodiment of the invention.
Figure 4A:
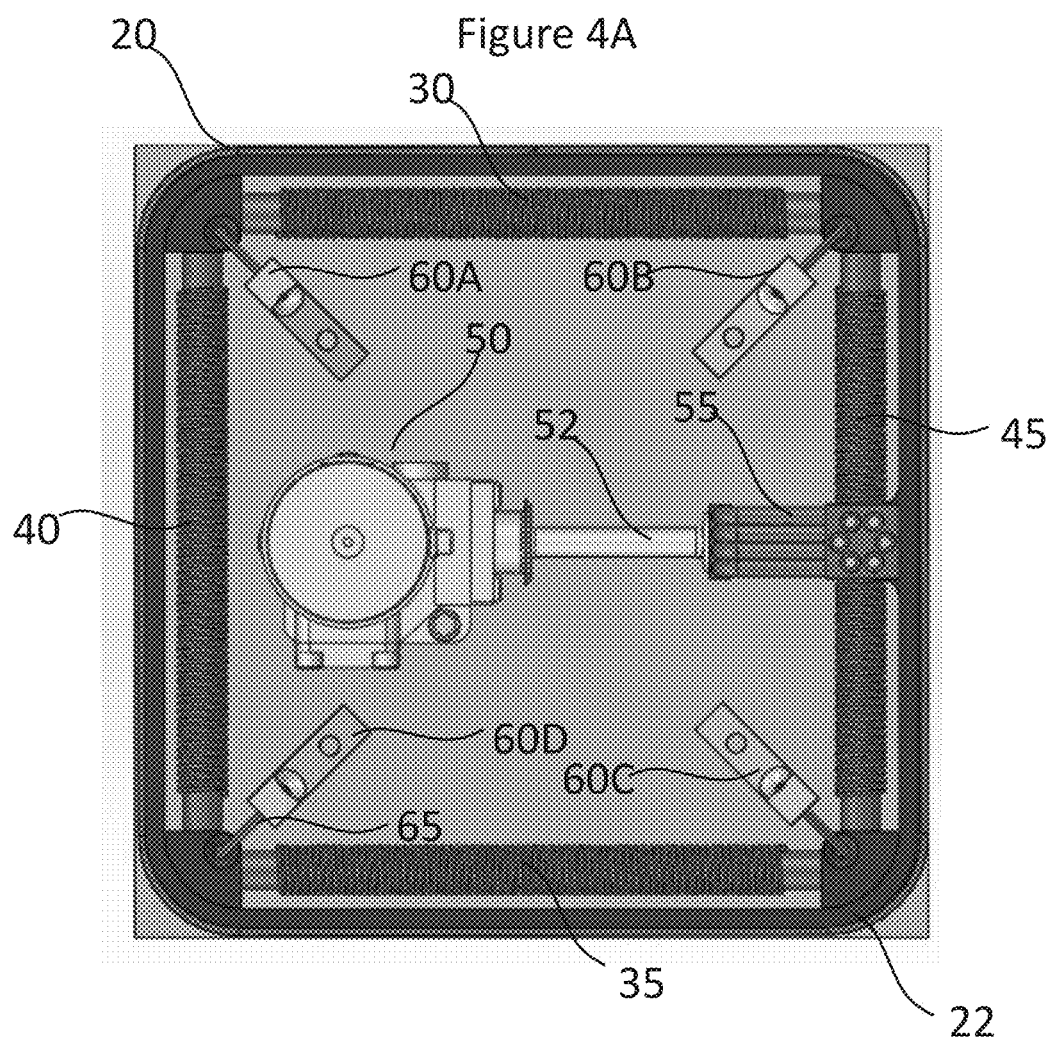
FIG. 4: shows a top down and side plan view of the system according to an embodiment of the invention.
Figure 4B:
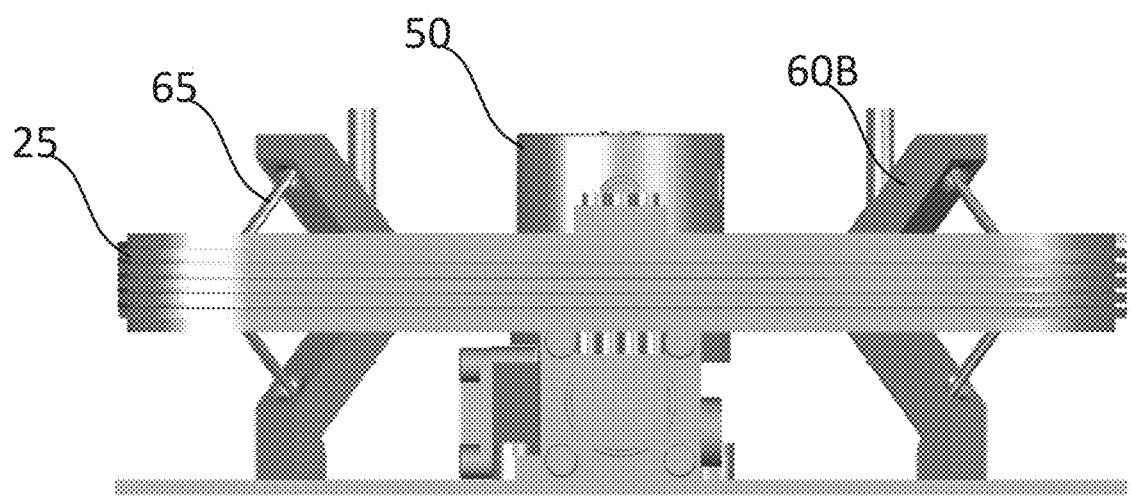

FIGS. 3 and 4 show a magnetic position control system 10 according to an embodiment of the invention. A primary superconducting electromagnet is formed of a superconducting coil 20 wound around the outer perimeter or periphery of a frame member 22, said coil 20 having a characteristic axis 20A.

In an embodiment the frame member 22 is formed of a non-magnetic material such as ceramic or plastic such that the primary electromagnet may be classified as a so-called air-core electromagnet. In a further embodiment, the frame member is made from a ferromagnetic material, such as iron, nickel or cobalt thereby forming the core of the primary electromagnet. Alternatively, any other suitable material may be employed. Whilst depicted as generally rectangular, the frame member 22 may take any required shape as dictated by a specific application including but not limited to circular, elliptical, discorectangular, and square-shaped.

In an embodiment, the conducting coil 20 is formed of approximately 100 m long, 2-4 mm wide, 96 μm thick Superpower wire or 2G YBCO HTS tape/wire producing approximately 60 mm diameter coil 20.

Along each side of the inner perimeter of the frame member 22 is arranged one of four secondary superconducting electromagnets consisting of a HTS coil wound around a cylindrical or rod shaped core. In an embodiment each coil is formed of 2G YBCO HTS tape/wire.

In a further embodiment, each coil is wound around a core formed of either ferromagnetic material (such as iron, nickel, and cobalt) or non-ferromagnetic material (such as plastic or ceramic). In an alternative embodiment, the no core is provided. Each secondary electromagnet is formed of a coil 30, 35, 40, 45 having respective characteristic axes 30A, 35A, 40A and 45A.

In the illustrated embodiment, axis 20A, 30A and 40A are depicted as mutually orthogonal, however any non-parallel arrangement that provides a component of a magnetic moment in each of the three special dimensions may also be used. Similarly, whilst only three orthogonally arranged coils 20, 30, 40 are required to provide 6 degrees of freedom, the embodiment shown in FIG. 3 is provided with two additional coils 35, 45 whose axis 35A and 45A are parallel to axes 30A and 40A of coils 30 and 40. This allows for the uniform distribution of mass throughout the system, which can be particularly important in satellite applications. In a further embodiment, additional secondary electromagnets may be provided having additional axis, pointing out of the plane defined by the primary electromagnet. In a yet further embodiment, only the primary electromagnet is provided in isolation. Alternatively, the primary electromagnet is provided in combination with only one of secondary electromagnetic coils 30, 40. In a particular embodiment, the primary electromagnet is provided by winding the coil 20 around each individual side arm of frame member 22 thereby approximating four coils arranged along the edge of a square.

The particular configuration depicted in FIGS. 3 and 4 uses a combination of a so-called pancake coil arranged around four rod coils to provide a magnet configuration that uses the least amount of space and saves mass whilst still providing the necessary 3-axis magnetic field.

Whilst not shown, it is envisaged that the system 10 further comprises insulating material arranged to reduce radiative heat transfer between the primary and secondary electromagnets and their surrounding environment.

The frame member 22 is suspended at each of its corners by four brackets 60A-D via insulating structural members 65. In an embodiment, the structural members 65 are provided in the form of cables. In an embodiment, the brackets 60A-D are formed from one of nylon, aluminium, titanium or PTFE, whilst said insulating structural members 65 are formed of any one of Kevlar, stainless steel, or plastic-though any other suitable materials may be employed. In an alternative embodiment to that illustrated in FIGS. 3 and 4, no frame member 22 is provided, and the brackets are used to suspend the primary electromagnetic coil 20 directly.

This suspension system serves to thermally isolate the superconducting electromagnetic coils, reducing the thermal load and decreasing the cooling time and power required to cool the coils below their critical temperature $T_C$, whilst also insulating the coils from any sources of heat hereby reducing the cooling power required to maintain the coils in the superconducting state.

The suspension system also serves to dampening vibrations and external forces transferred from the main body to the frame member 22 (such as those experienced during launch of a spacecraft).

Additionally, the open centre area of the primary electromagnet and it's elevation provides more space for the cryocooler, suspension system, and power transfer system to be mounted on a base plate. This reduces the space used for the design, allowing for a more compact system—where space is often at a premium onboard satellites and other spacecraft.

Figure 5:
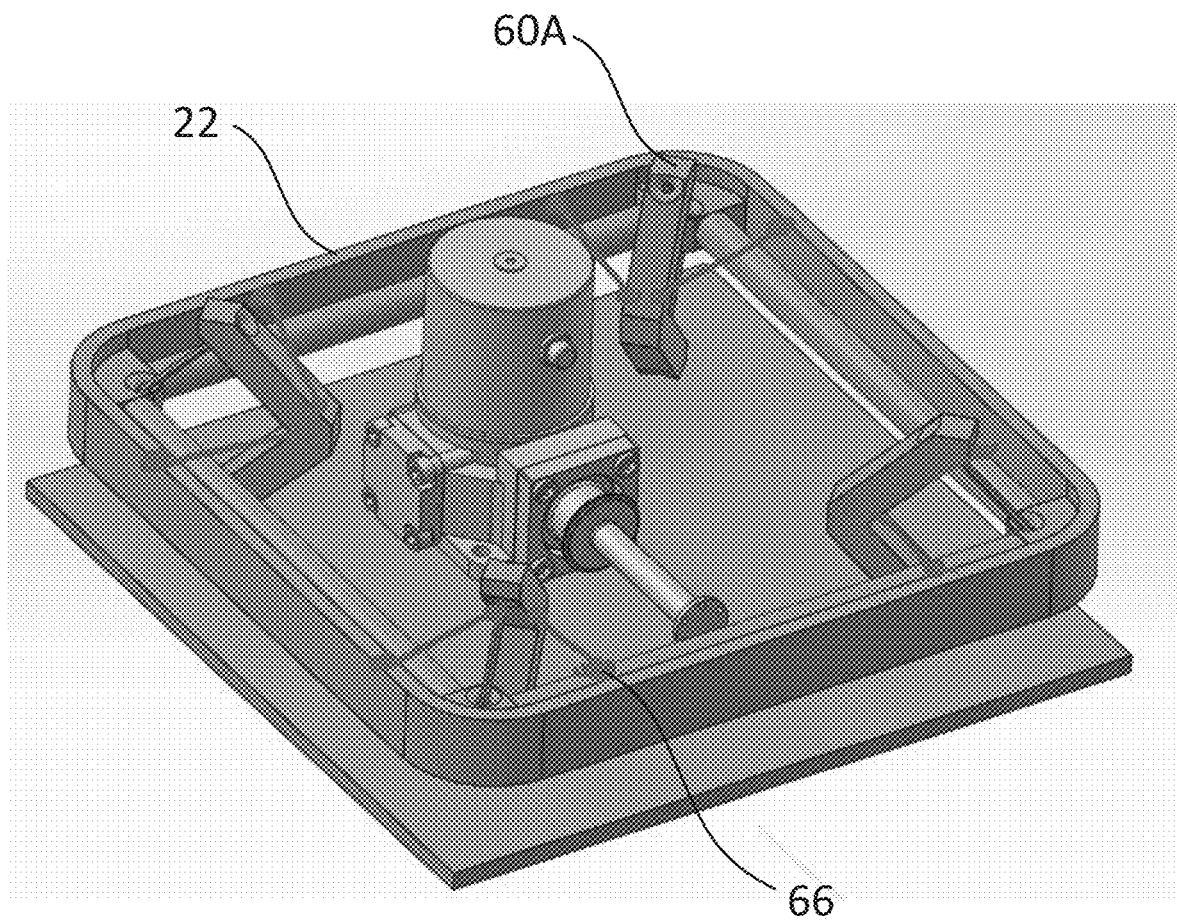
FIG. 5: shows an isometric view of certain components of the system according to an embodiment of the invention.

FIG. 5 shows a further embodiment in which two additional horizontally arranged insulating structural members 65 are provided on each bracket 60.

Figure 6:
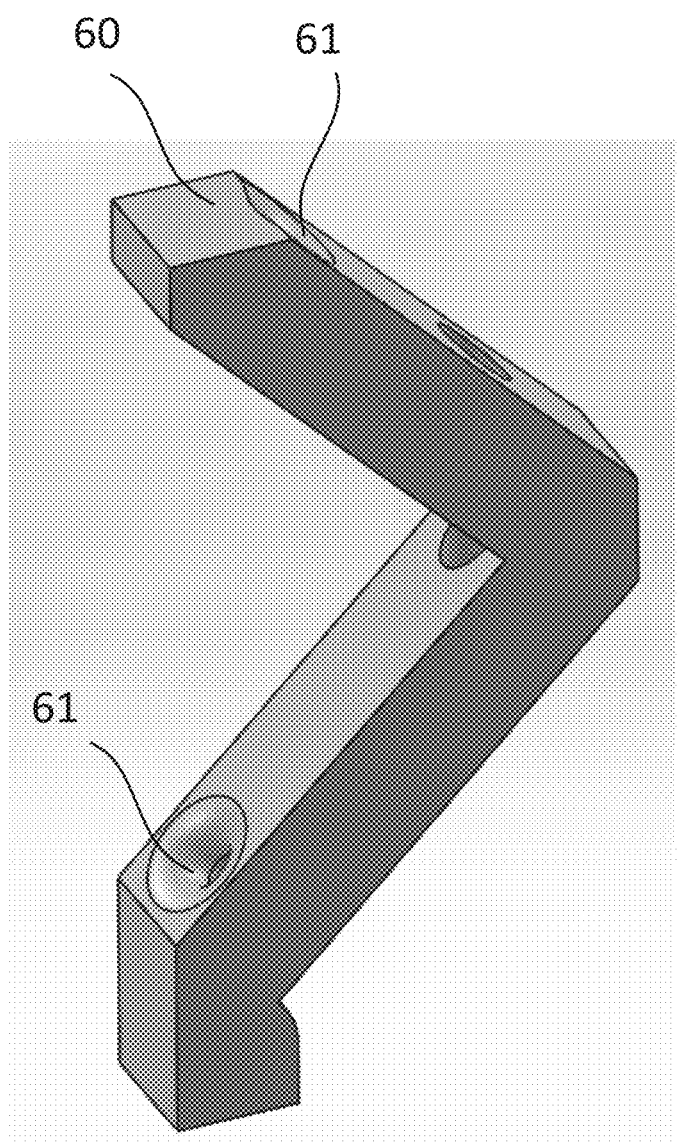
FIG. 6: shows an isometric view of a bracket in isolation according to an embodiment of the invention.

As shown in FIG. 6, each of the four brackets 60A-D are generally V-shaped and are provided with various apertures and anchor points 61 through which is threaded the insulating structural members 65 from which the frame member 22 is suspended.

Figure 7:
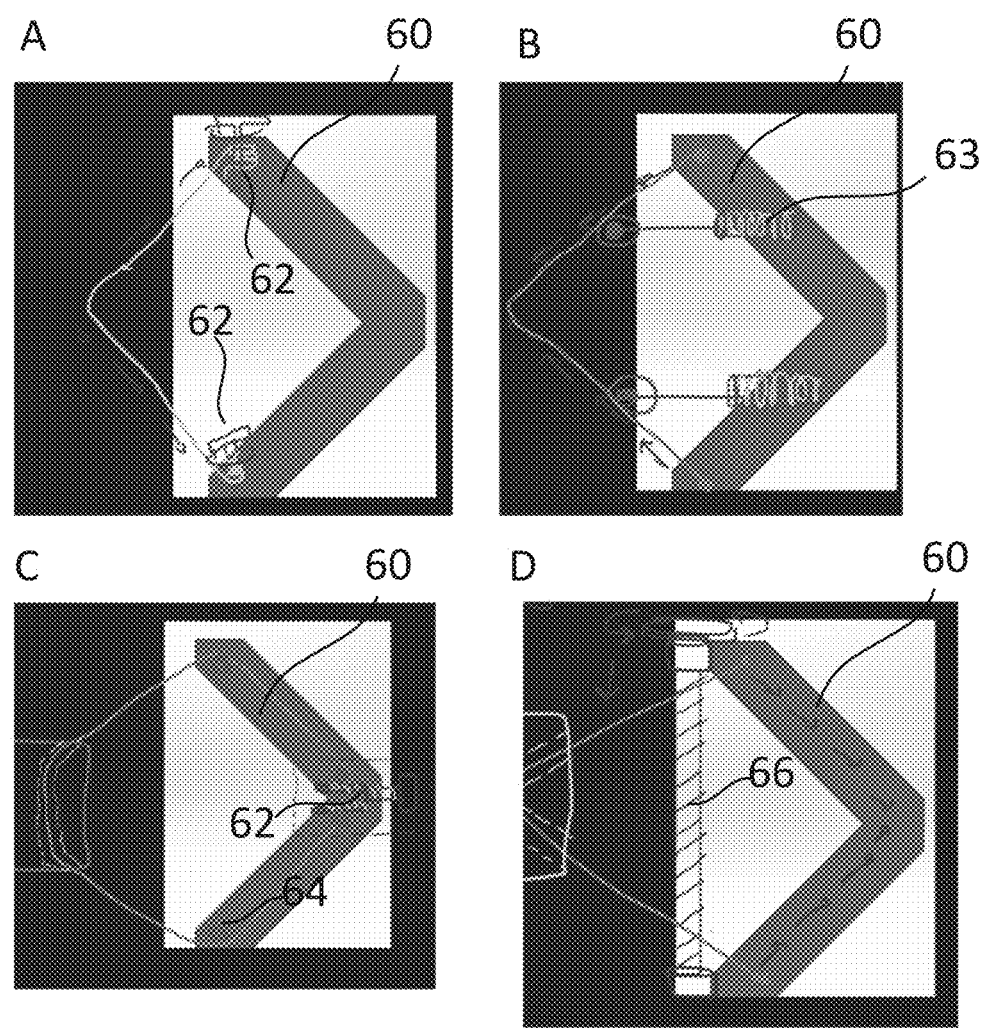
FIG. 7: shows various adjustment mechanisms of a suspension system according to an embodiment of the invention.

FIG. 7 depict various arrangements of the brackets 60A-D and insulating structural members 65 with alternative adjustable and/or automatic tensioning means that make use of one or more tension screws 62, spring-loaded pulleys 63, roller pins 64, worm gears 66 and springs 67 to adjust and/or maintain the tension applied to the insulating structural member 65 that support the frame member 22. The setup shown in FIG. 7A uses two tension screws 62 to enable the insulating structural member 65 to be tensioned in multiple directions. The setup shown in FIG. 7B utilises spring loaded pulley wheels to tension the insulating structural member 65, wherein the tension may be adjusted by tightening the springs. The setup shown in FIG. 7C allows the tension on the insulating structural member 65 to be adjusted evenly by a single tension screw 62.

In a particular embodiment the brackets 60A-D are themselves formed of a resiliently flexible material and are configured during assembly to provide a constant tension to the insulating structural member 65—thus alleviating the need for any mechanical actuation means that may otherwise be required to adjust the structural member tension. In FIG. 7D, a screw is inserted through the bracket to selectively adjust the tension of the bracket itself.

Figure 8A:
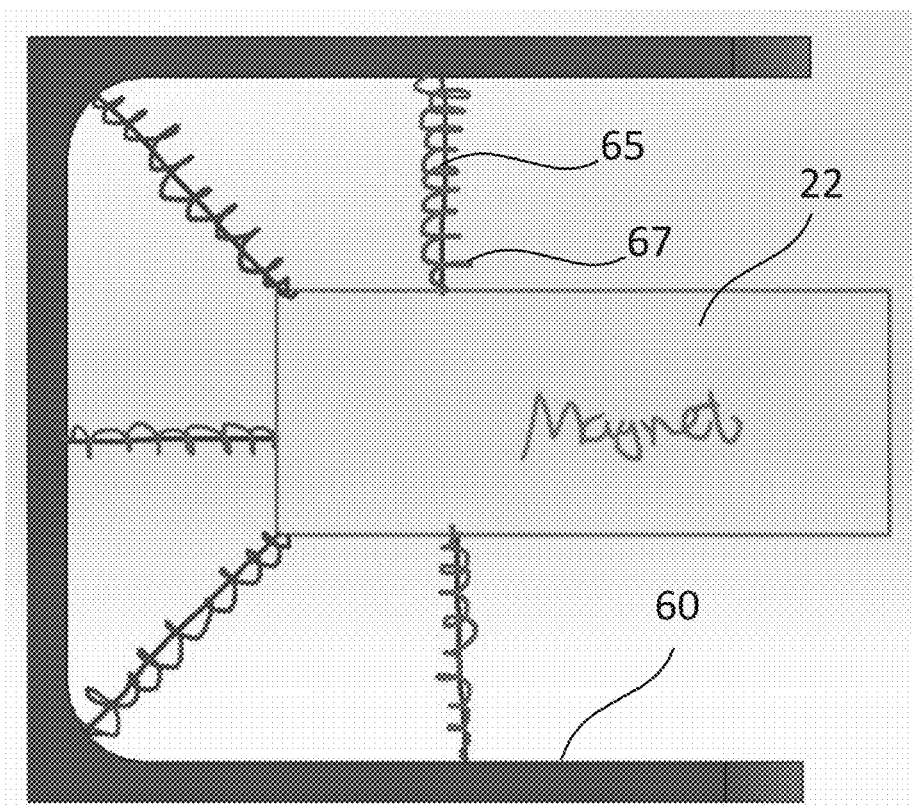
FIG. 8: shows various the arrangements of a suspension system according to an embodiment of the invention.
Figure 8B:
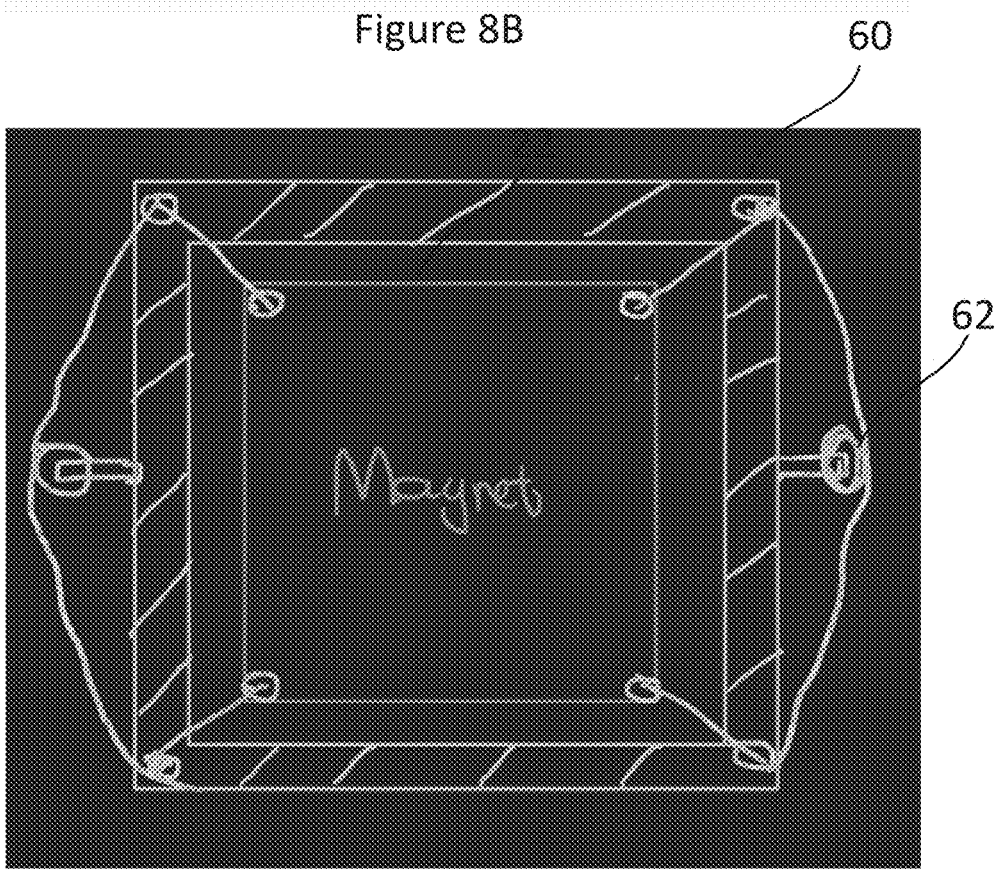

FIGS. 8A and 8B depict alternative embodiments is which a singular u-shaped or square-shaped bracket are provided. The operating principle and advantages remain as described above. In the embodiment of FIG. 8A, the insulating structural member 65 is coupled with springs 67 to increase rigidity and damping.

Also shown in FIGS. 3 and 4 is a cryocooler 50 arranged to thermally contact the frame member 22 (and through it each of coils 20, 30, 35, 40 and 45) by thermal linkage 55. In an alternative embodiment, the cryocooler 50 contacts each of the coils 20, 30, 35, 40, 45 directly. Whilst the cryocooler 50 is depicted as a Stirling cryocooler connected to the thermal linkage by its cold finger 52 or cooling element, any other suitable cooling means and/or heat extraction means may be employed such as a heat pump, heat exchanger, heat sink or pulse tube cryocoolers provided they function to extract heat from the superconducting electromagnets—with the absorbed heat being dissipated to the ambient space via radiation panels or otherwise.

Cryocoolers in particular provide a feasible cooling option in a satellite environment, having relatively small volume and power requirements. Further, using cryocoolers means no working fluid/sleeve is required to cool the electromagnets, nor do they rely on any consumable cryogen supply. In a particular embodiment, a pulse tube cryocooler is used, providing a further advantage of reduced vibration as compared to piston-based cryocoolers.

In an embodiment, the thermal linkage is provided in the form of a flexible braided copper connector or thermal strap. This has been found to provide optimal thermal conduction whilst being resilient to forces experienced during operation of the system and launch. Moreover, use of a thermal strap is advantageous as it provides a natural conduction path for cooling without adding structural loads to the satellite components. Thermal straps have lower mass, are smaller in size and offer better conduction as compared to traditional thermal solutions. Some thermal straps also show increased conductivity at cryogenic temperatures and they are effective in dissipating heat from high-powered electronic components. In an alternative embodiment, the cold finger 52 of the cryocooler 50 directly contacts the frame member 22 such that no thermal strap or linkage 55 is required.

Whilst not depicted, a further embodiment is envisaged that utilises a second cryocooler arranged in opposition to cryocooler 50 so as to cancel out any axial vibrations imparted to the cold finger 52 and thermal linkage 55. The second cryocooler also enables faster cooling.

Though not shown in FIG. 3 or 4 the system 10 further includes a power source to energise the superconducting electromagnets. In an embodiment, this is provided in the form of an electromagnetic flux injection device. In a further embodiment, the power source is provided by one or more contactless electromagnetic flux pumps such as a linear flux pump or a non-linear flux pump (using permanent magnets rather than solenoids) that allows for wireless and/or inductive power transfer to the superconducting coils.

In use, the cryocooler 50 acts to reduce the temperature of the electromagnetic coils 20, 30, 35, 40, 45 below their critical temperature $T_c$ such that they transition from the normal resistive state and become superconducting. As described above, the superconducting electromagnets have zero electrical resistance and therefore can conduct much larger electric currents, creating a higher intensity magnetic field requiring comparatively lower energy consumption than conventional non-superconducting magnetorquers.

This magnetic field may be used for repositioning of a spacecraft on or within which the system 10 is mounted. Advantageously, the high field strength magnetic field may also be used to deflect incident charged radiation, thereby protecting both the system 10 and spacecraft (including other spacecraft within said field).

Once in this superconducting state, the electromagnetic flux injection device or electromagnetic flux pump are configured to derive energy from at least one external power source to energise the superconducting electromagnet(s).

In an embodiment, the electromagnetic flux injection device draws power from a battery or solar panel provided outside of the system 10. In an embodiment, the cryocooler 50 and electromagnetic flux injection device are operatively coupled to and controlled by a control device. Advantageously, the use of electromagnetic flux injection devices such as flux pumps to energise the electromagnet obviates the need for high-current power supplies which can be bulky and expensive, along with the requirement for physical current supply leads to constantly carry a charging current- which would lead to significant loses at the high currents required by this application.

A paper concerning a linear flux pump design which could be used to magnetize HTS tapes and coils is described in Fu, L., Matsuda, K., Baghdadi, M., & Coombs, T. (2015). Linear Flux Pump Device Applied to High Temperature Superconducting (HTS) Magnets. IEEE Transactions on Applied Superconductivity, 25(3), 1-4, which is incorporated by reference herein in its entirety. The design is based on an iron magnetic circuit together with copper solenoids and is powered by a current source driver circuit.

FIGS. 9-38 depict multiple alternative embodiments of the invention having distinct arrangements of the cryocooler 50 and superconducting electromagnetic coils that can provide multi-axis control.

Figure 9:
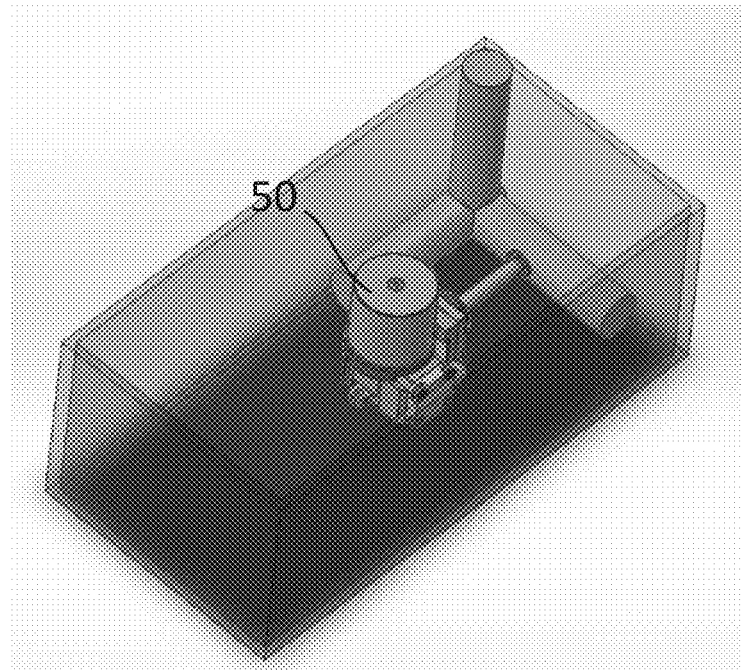
FIGS. 9-38: shows various arrangements of the electromagnetic coils according to different embodiments of the invention.
Figure 9:
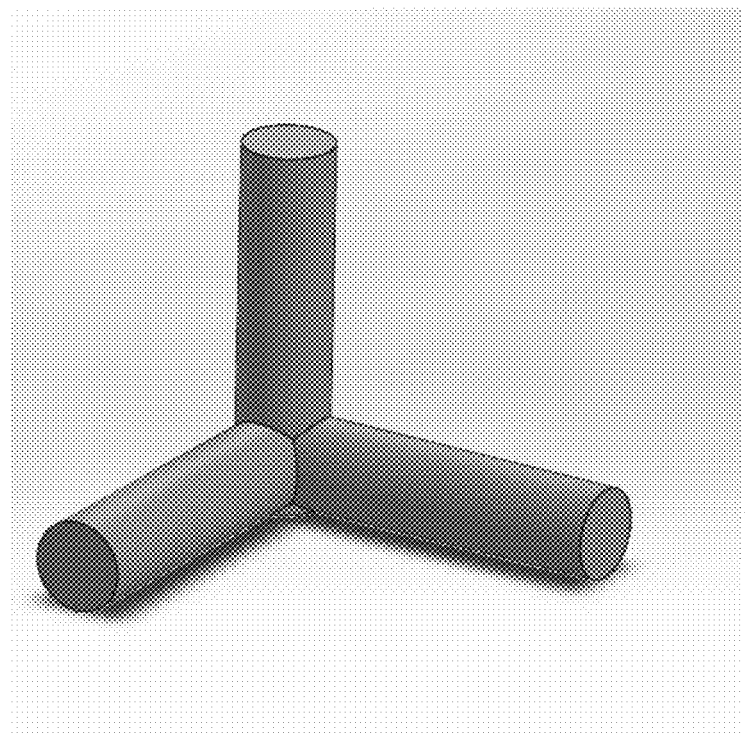

In particular, FIG. 9 depicts a 3-part cylindrical rod design comprising three electromagnets, each formed of a cylindrical rod having an iron core and an externally wrapped HTS wire coil.

Figure 10:
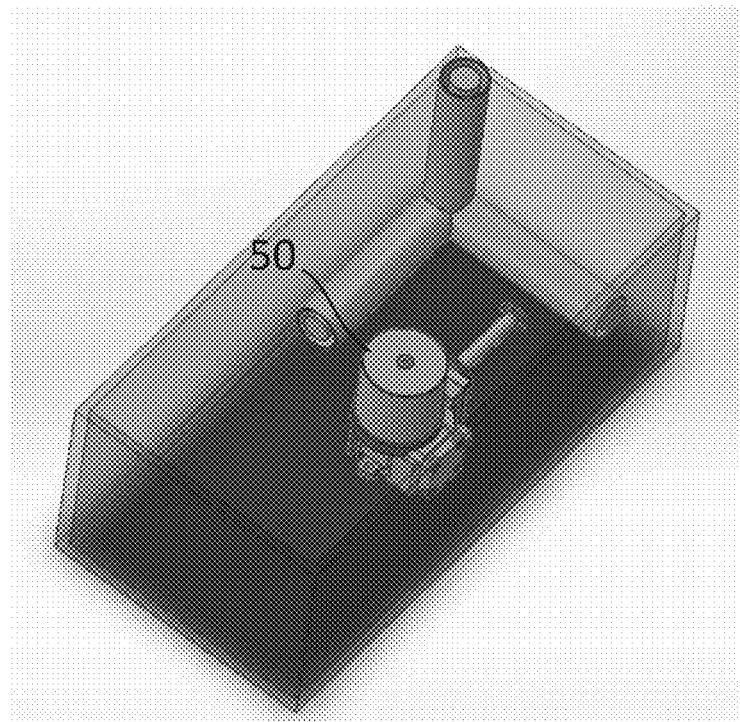
Figure 10:
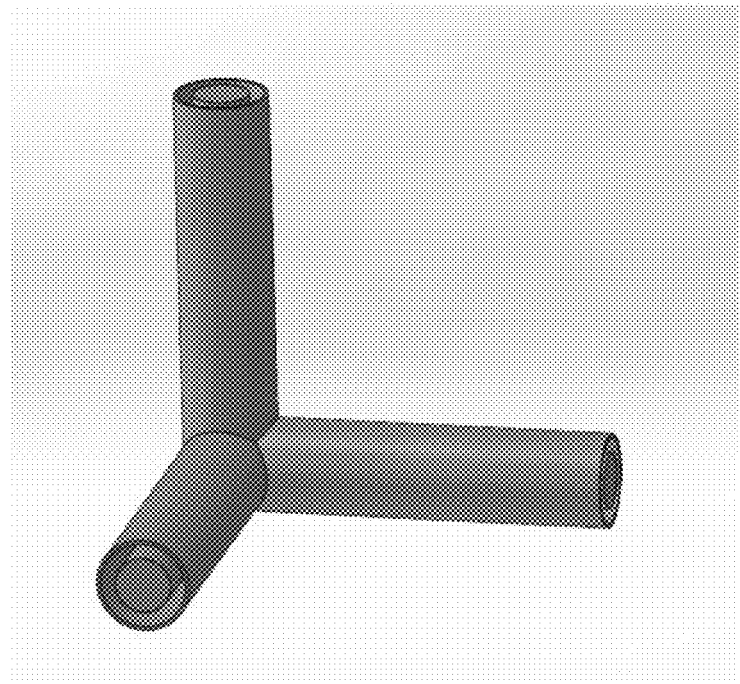

FIG. 10 depicts a pot core rod design comprising semi-hollow rods formed of a HTS wire wrapped inside a smaller cylindrical iron core with an outer cylindrical casing. Advantageously this design reduces the electromagnetic interference via the Pot core shielding effect.

Figure 11:
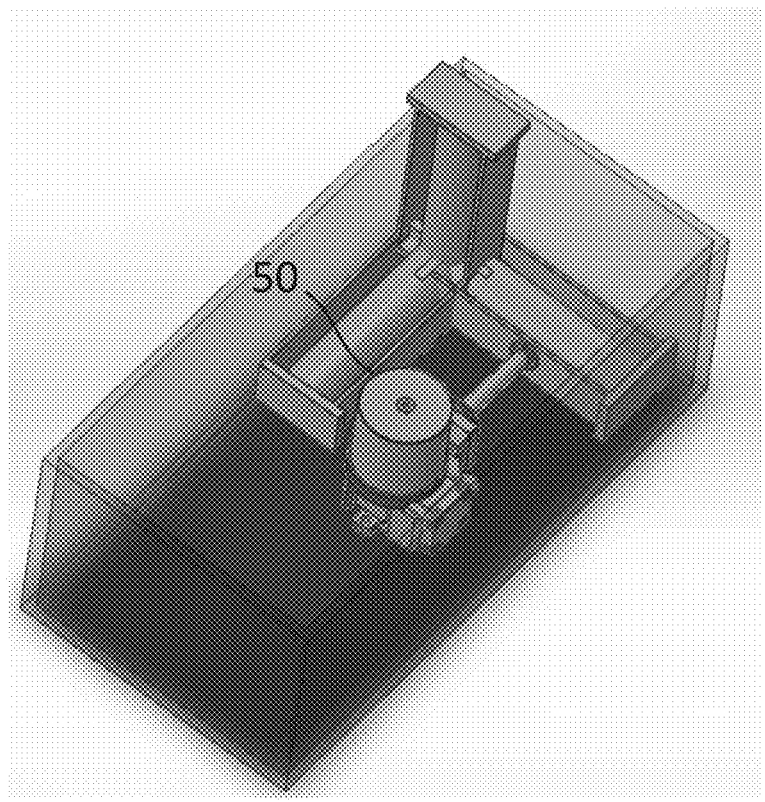
Figure 11:
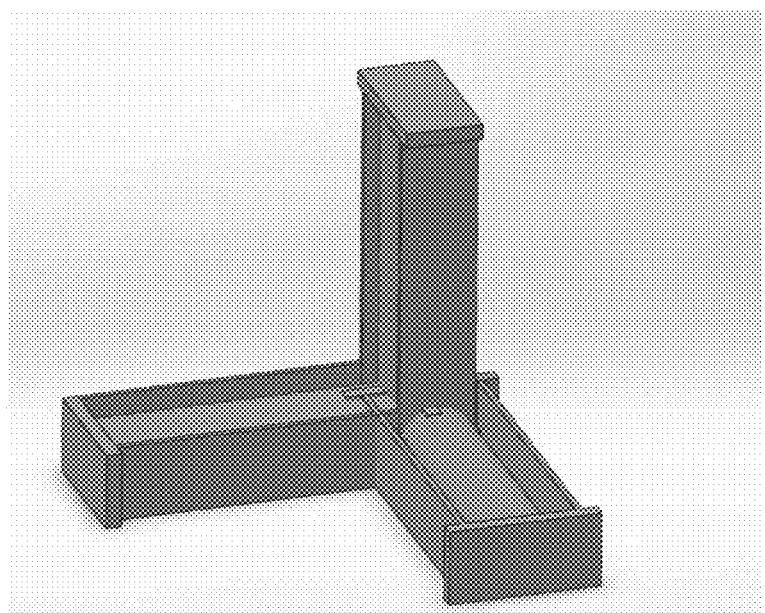

FIG. 11 shows a so-called E-core design having a cylindrical centre leg and two side legs connecting to form an iron core. The centre leg has a HTS coil wound in three axis.

Figure 12:
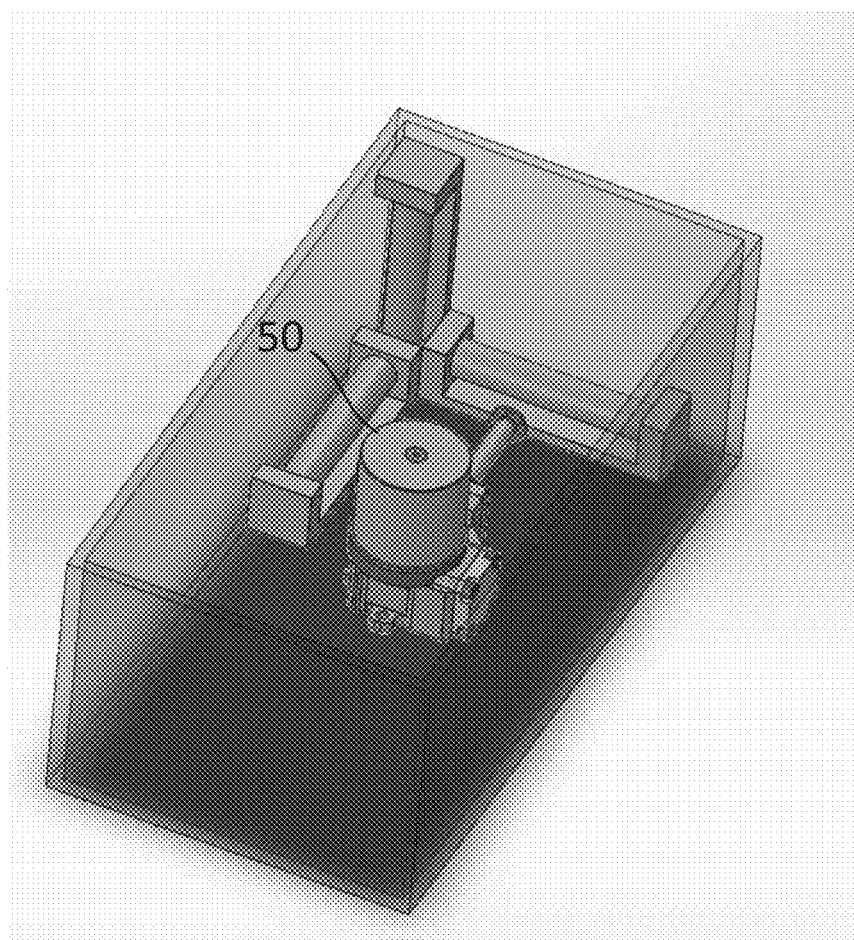

FIG. 12 shows a so-called U-core rod design. A U or C-shaped core is provided with a HTS coil wound around a cylindrical plastic bobbin.

Figure 13:
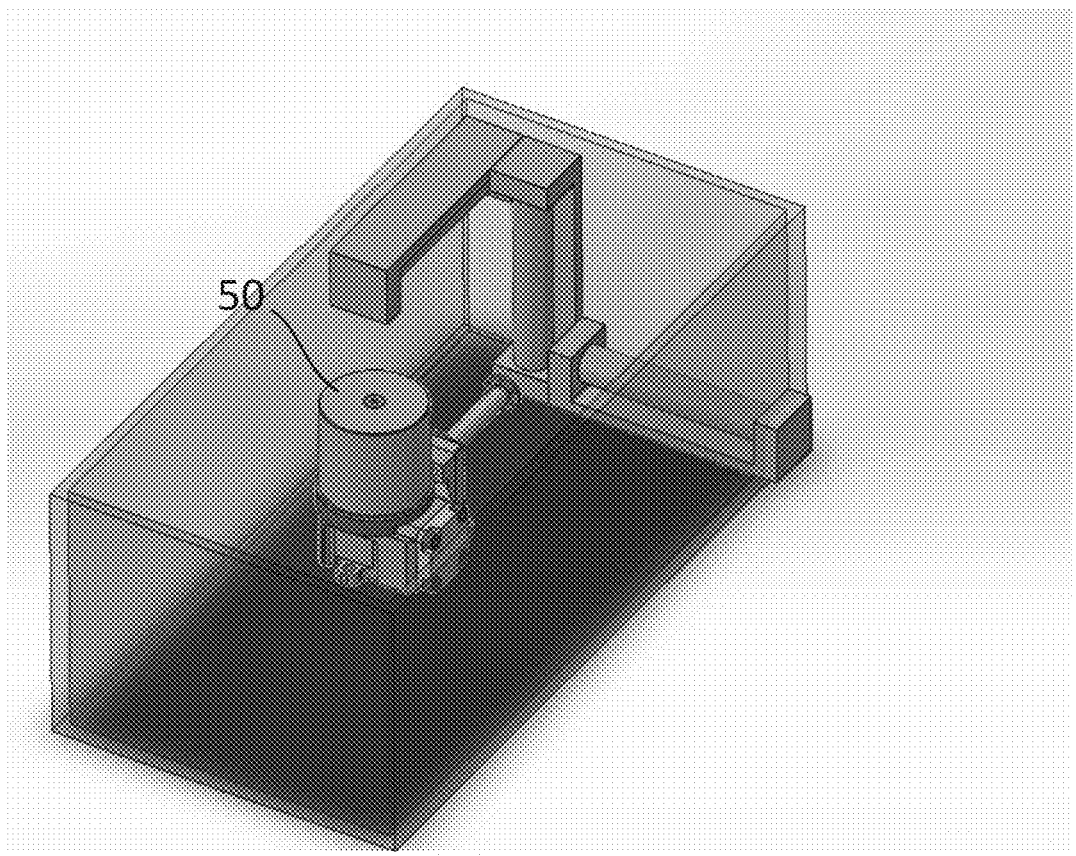

FIG. 13 shows a second configuration of the U-core rod design, using a different geometry whilst still providing three cores arranged along three orthogonal axes.

Figure 14:
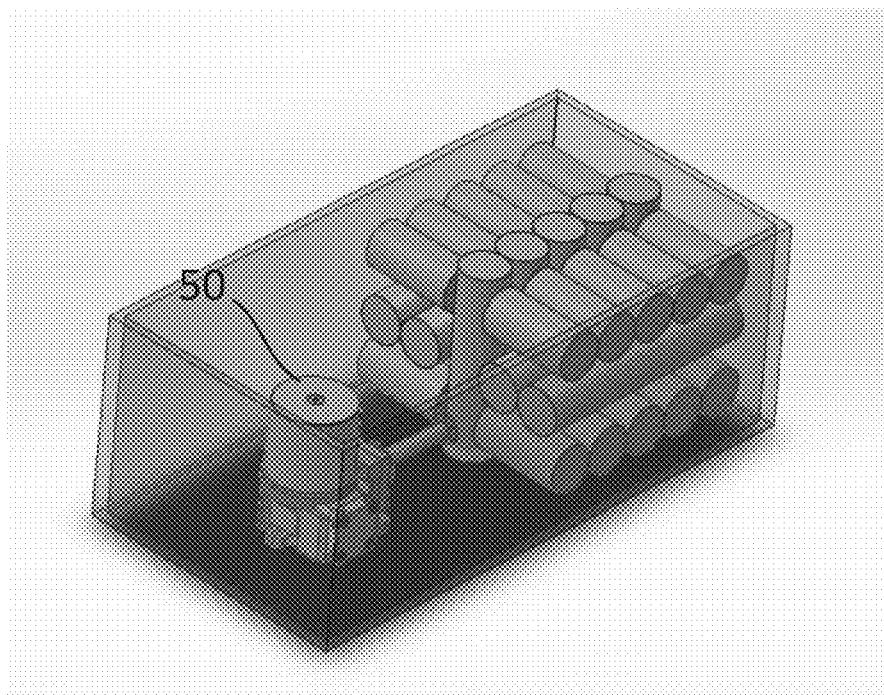
Figure 14:
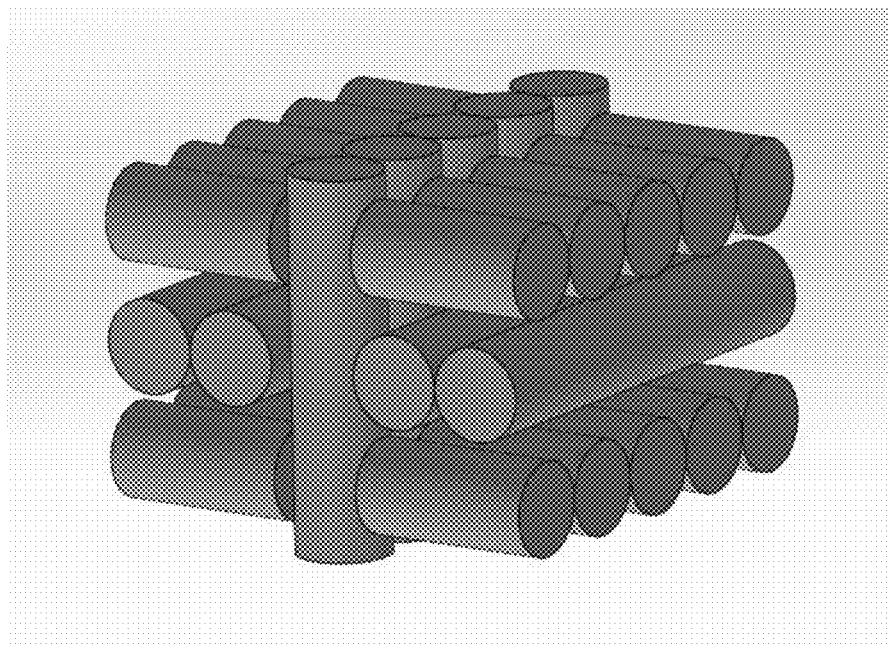

FIG. 14 shows a design utilising multiple smaller rods packed together along three directions so as to provide a larger distribution of the magnetic field.

Figure 15:
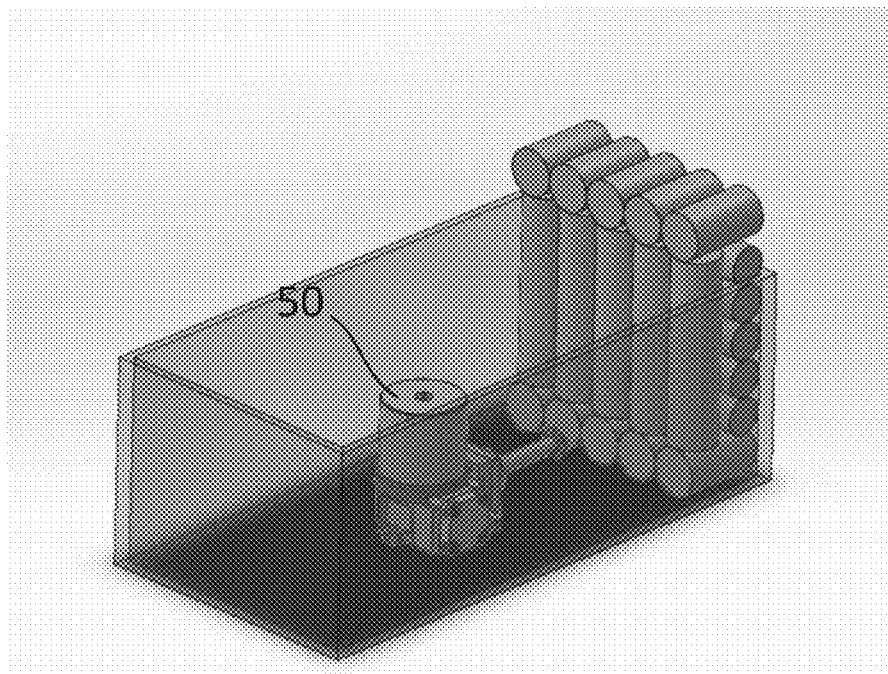
Figure 15:
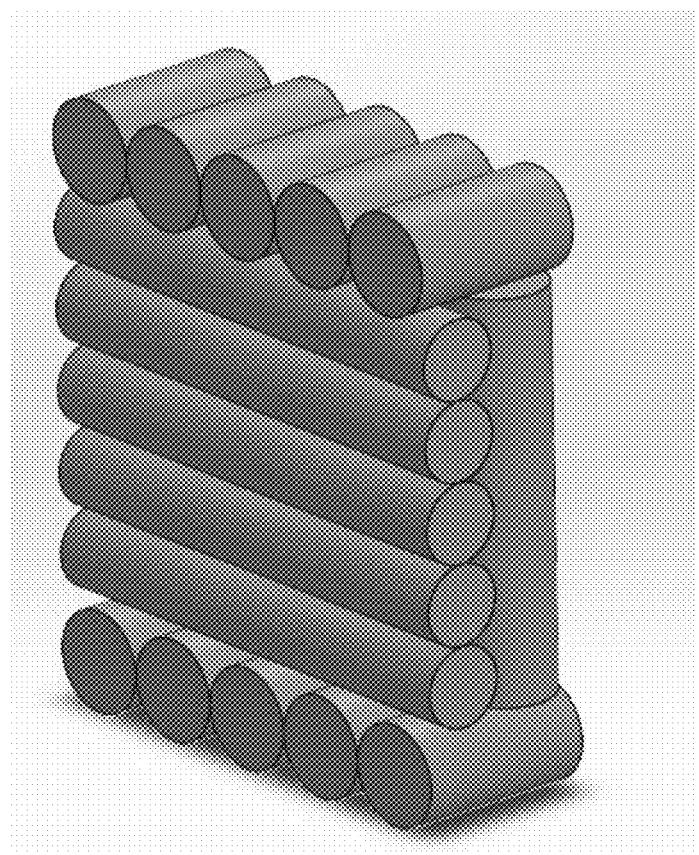

FIG. 15 shows a further design utilising multiple smaller rods stacked and arranged to provide the desired three-axis magnetic field. This particular configuration has a higher packing density.

Figure 16:
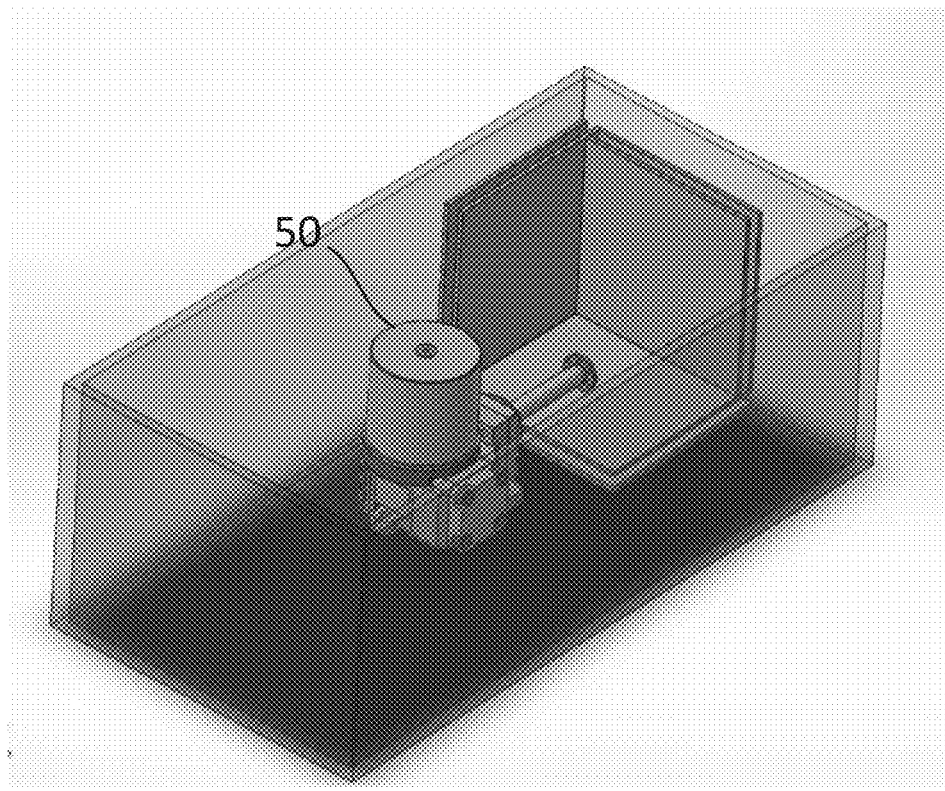
Figure 16:
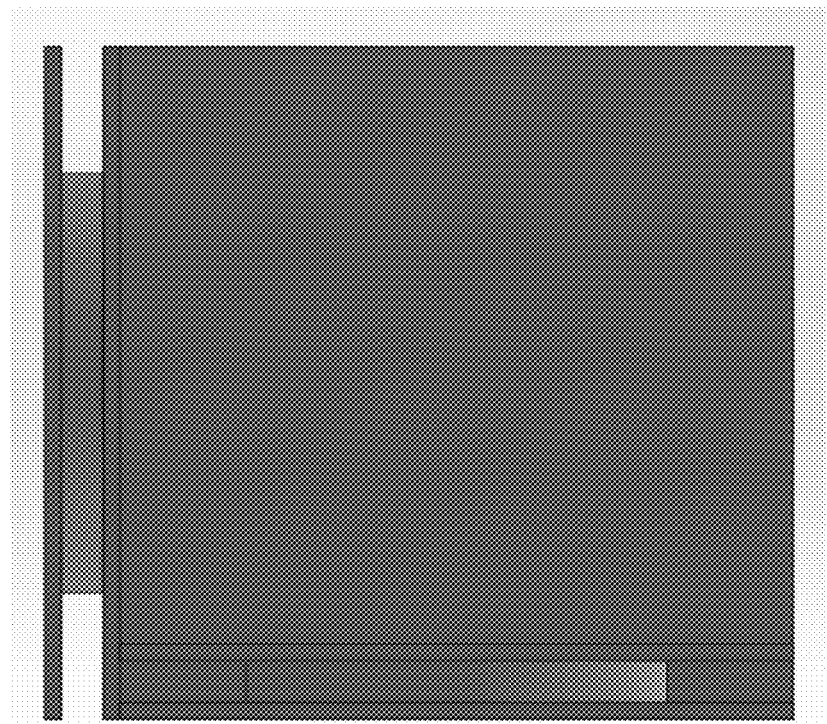

FIG. 16 shows a design that utilises three square pancake coils with copper bracing arranged to provide a magnetic field component in each of the three axes.

Figure 17:
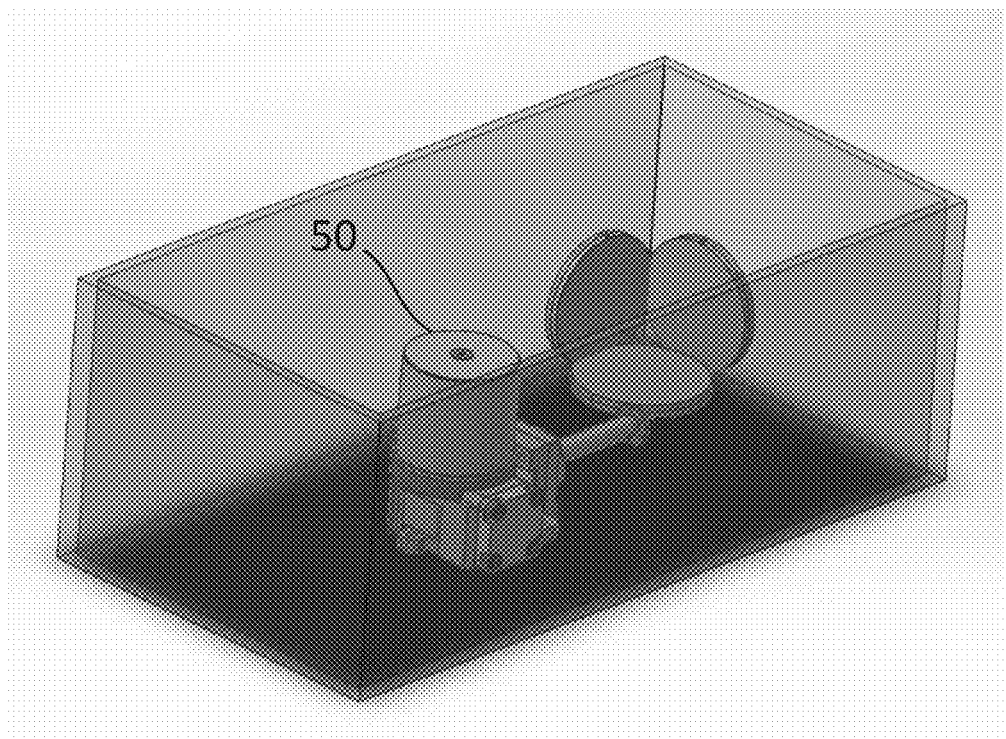
Figure 17:
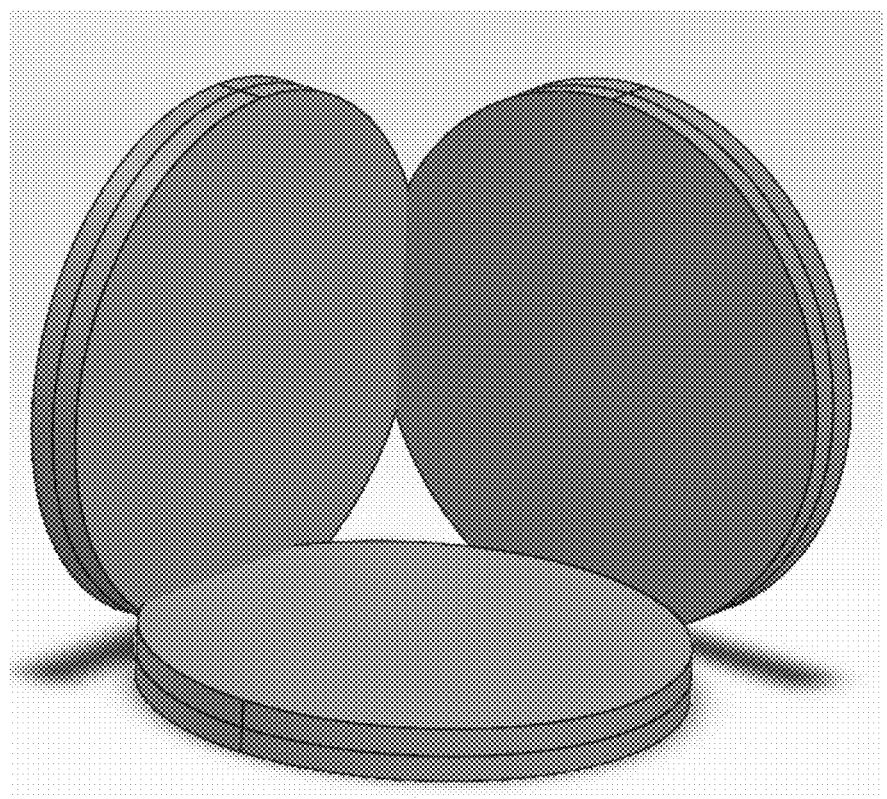

FIG. 17 shows a design utilising circular pancake electromagnets.

Figure 18:
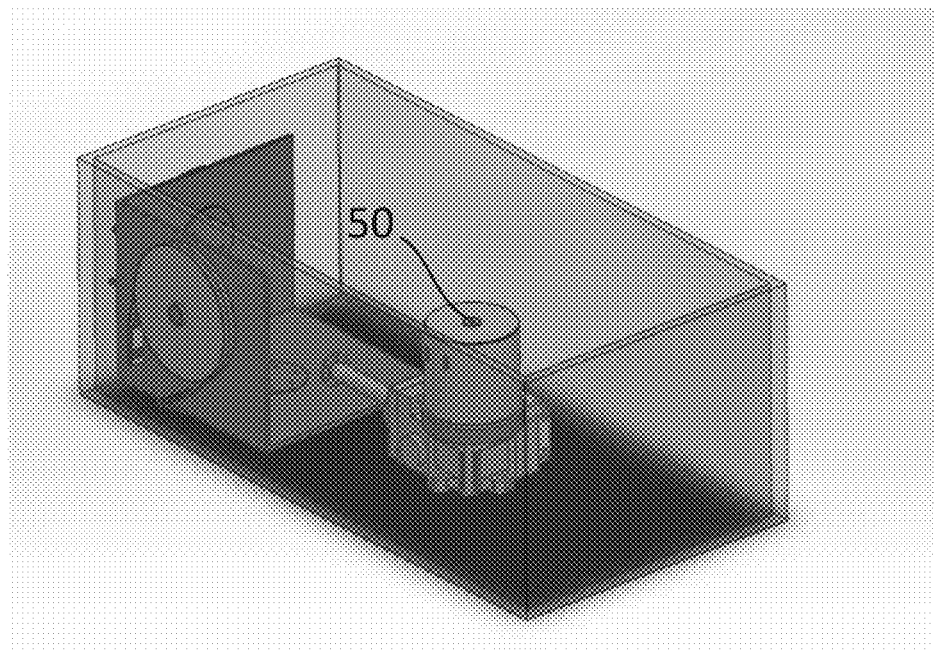
Figure 18:
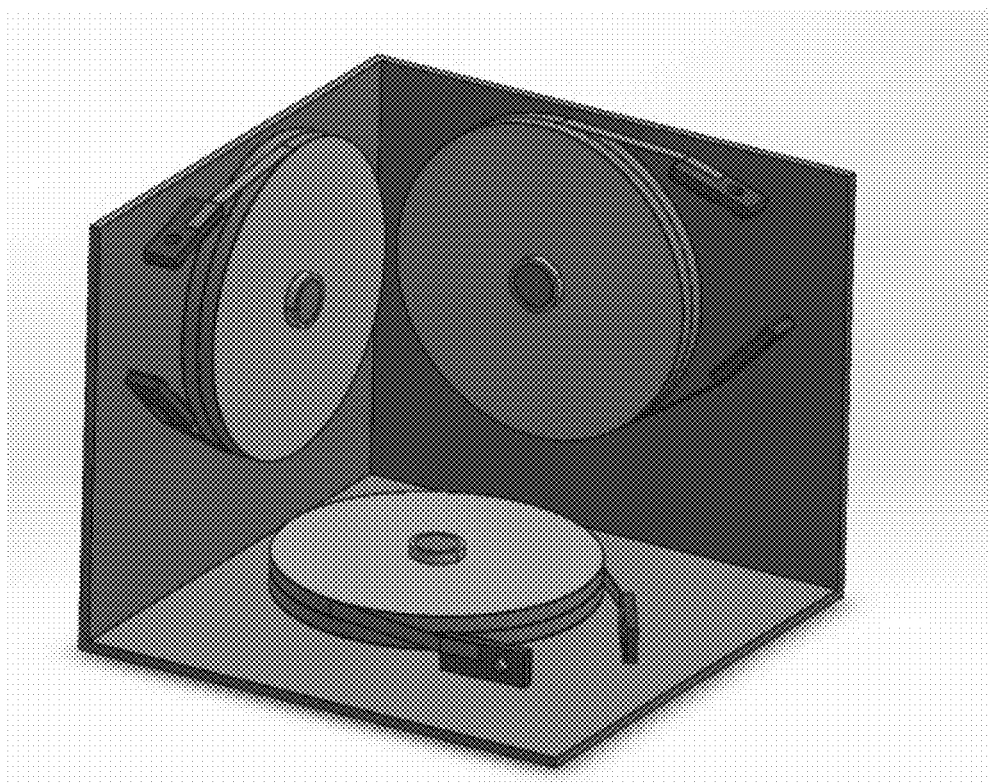
Figure 19:
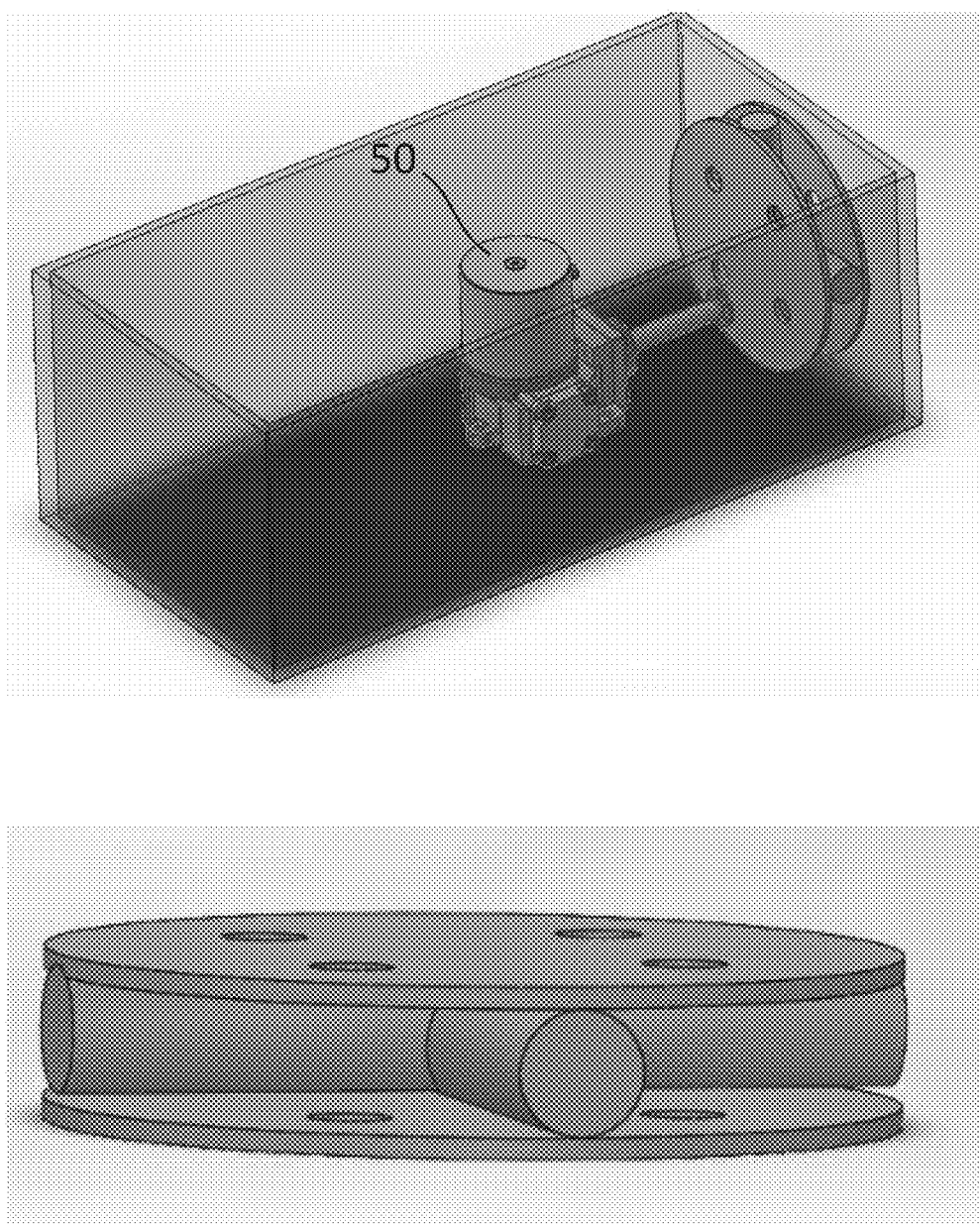
Figure 20:
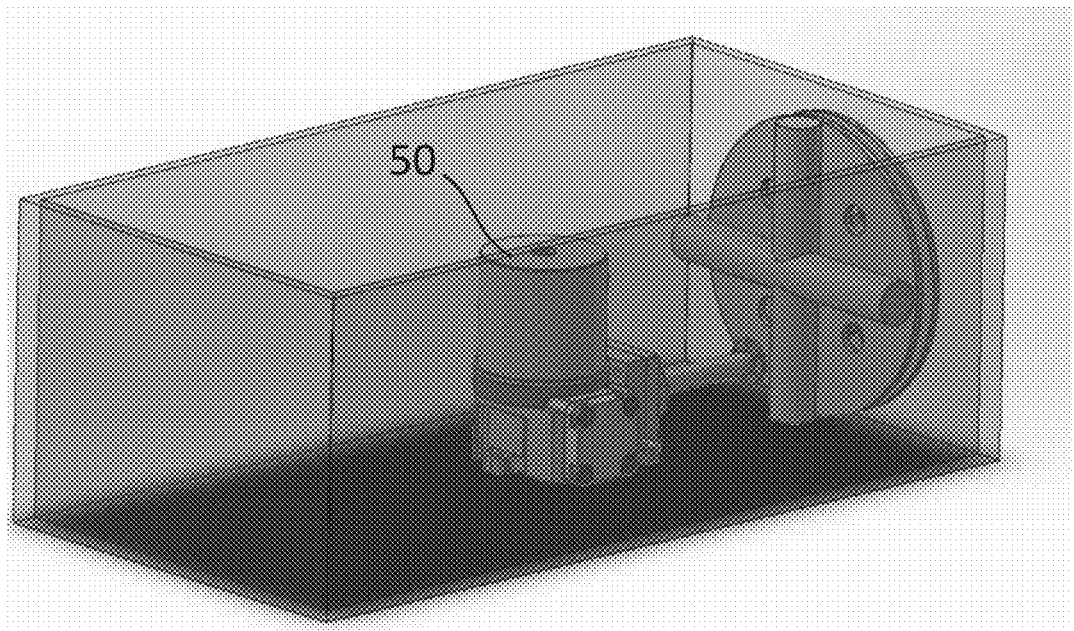
Figure 20:
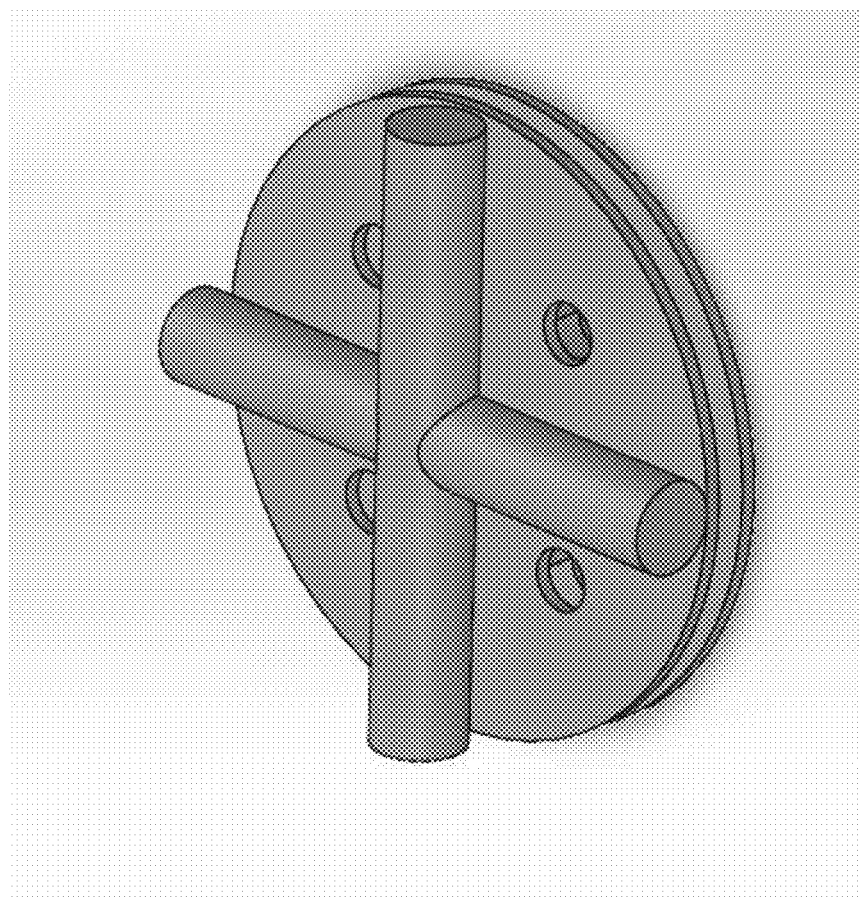
Figure 21:
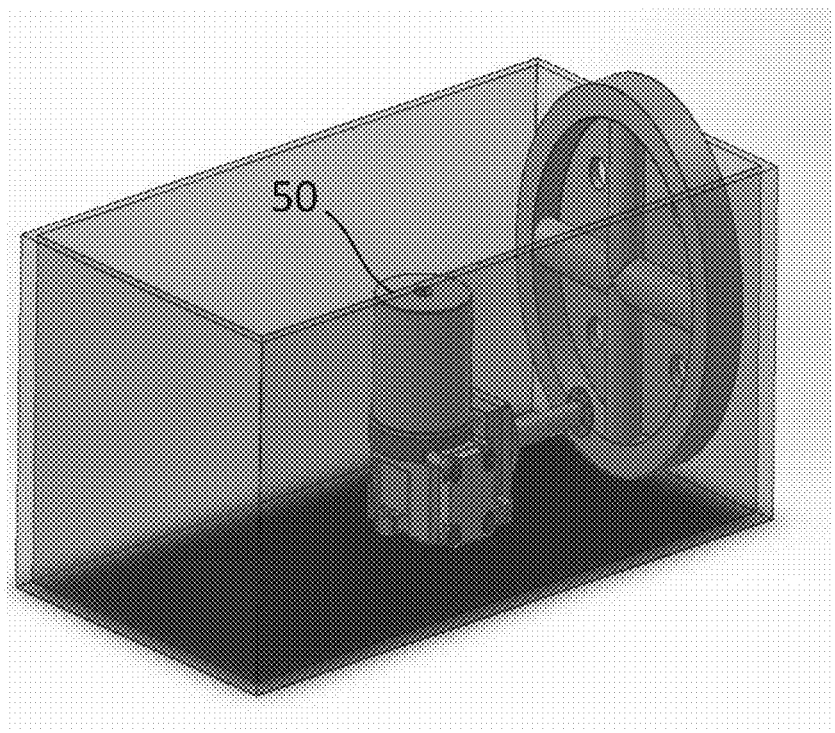
Figure 21:
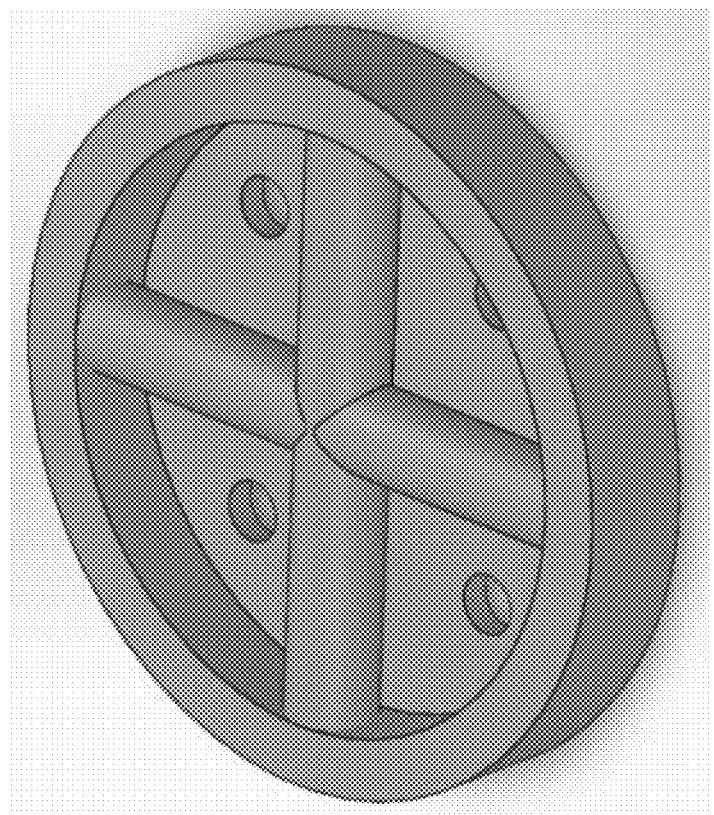
Figure 22:
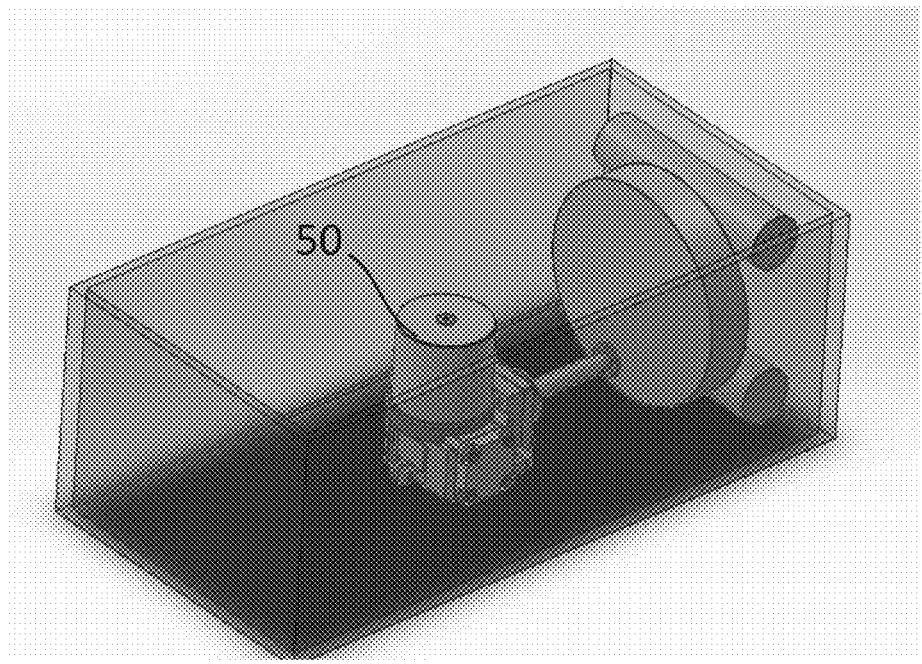
Figure 22:
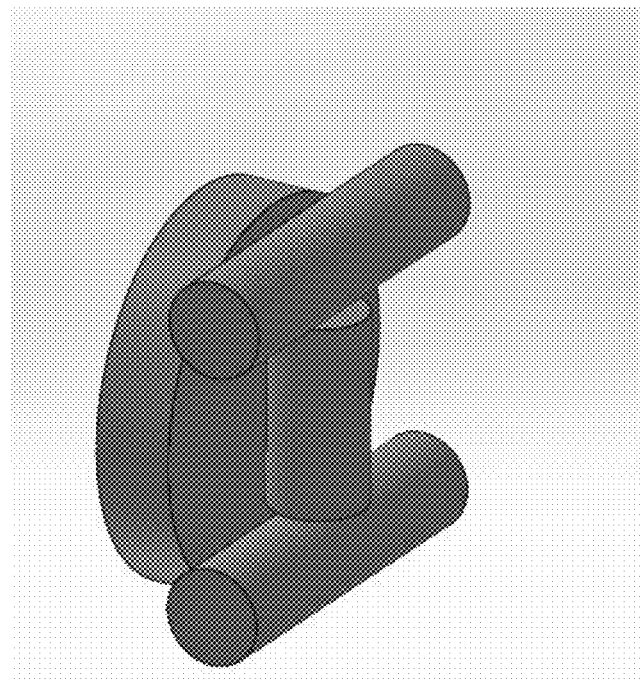
Figure 23:
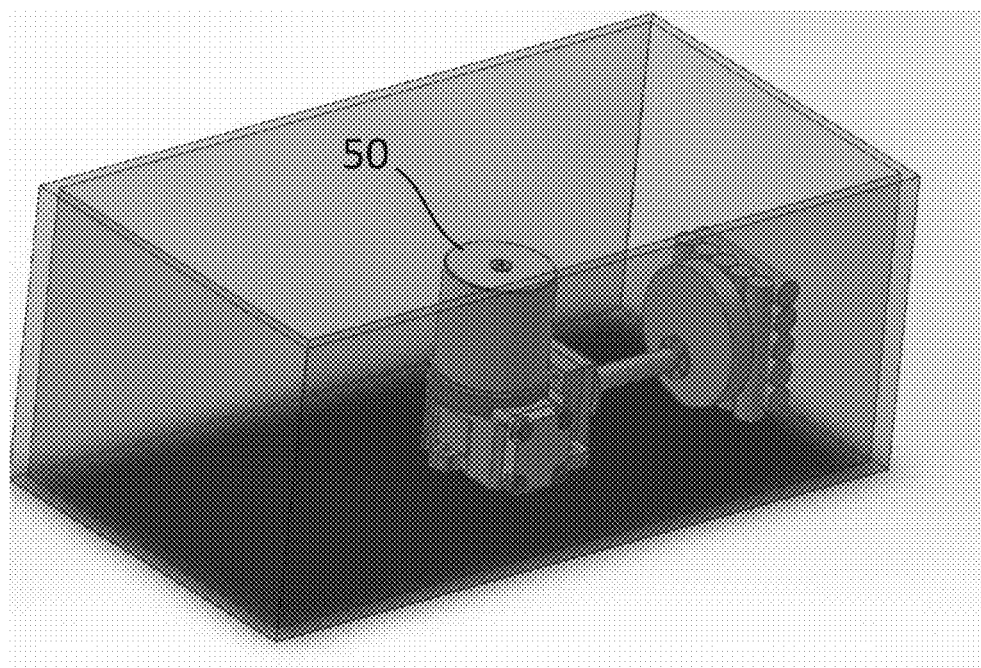
Figure 23:
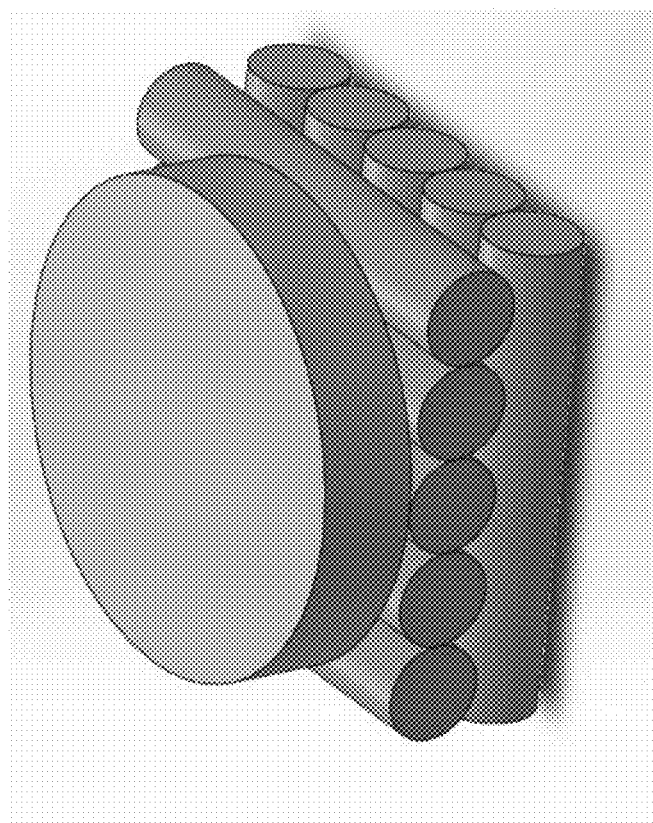
Figure 24:
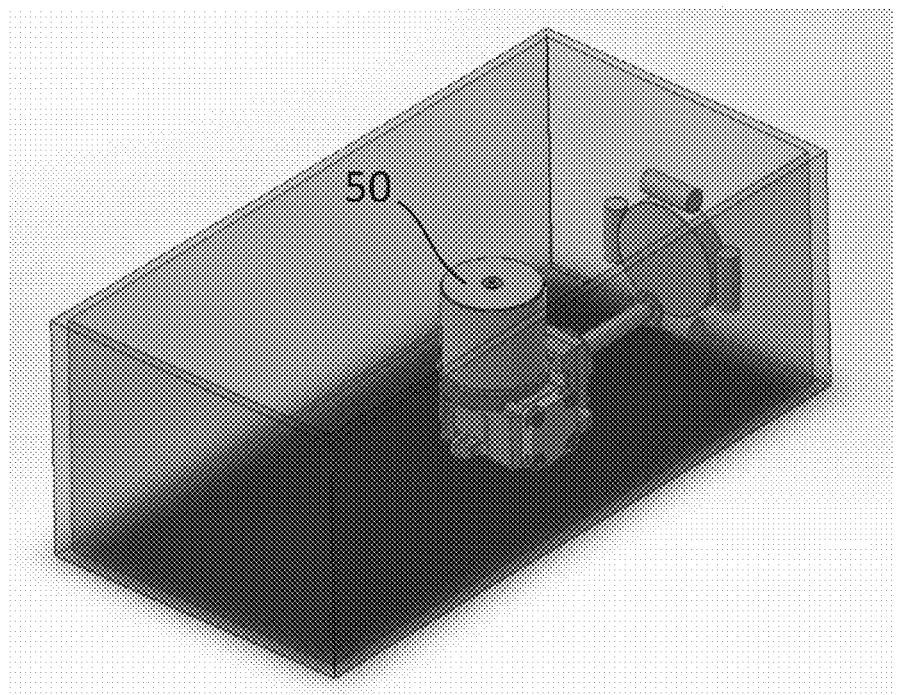
Figure 24:
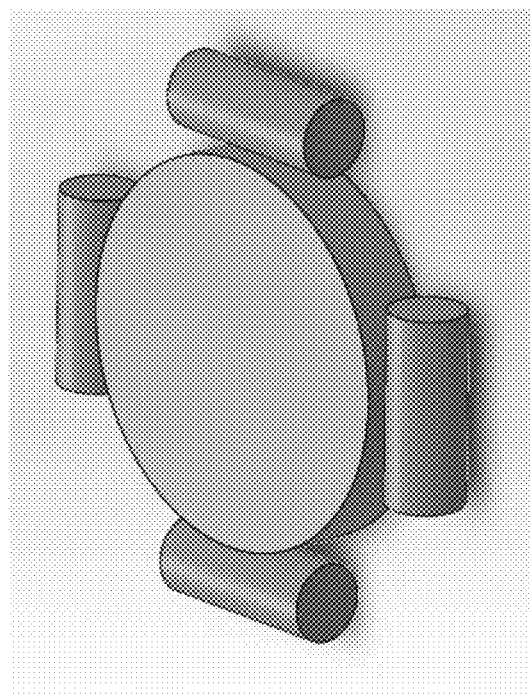
Figure 25:
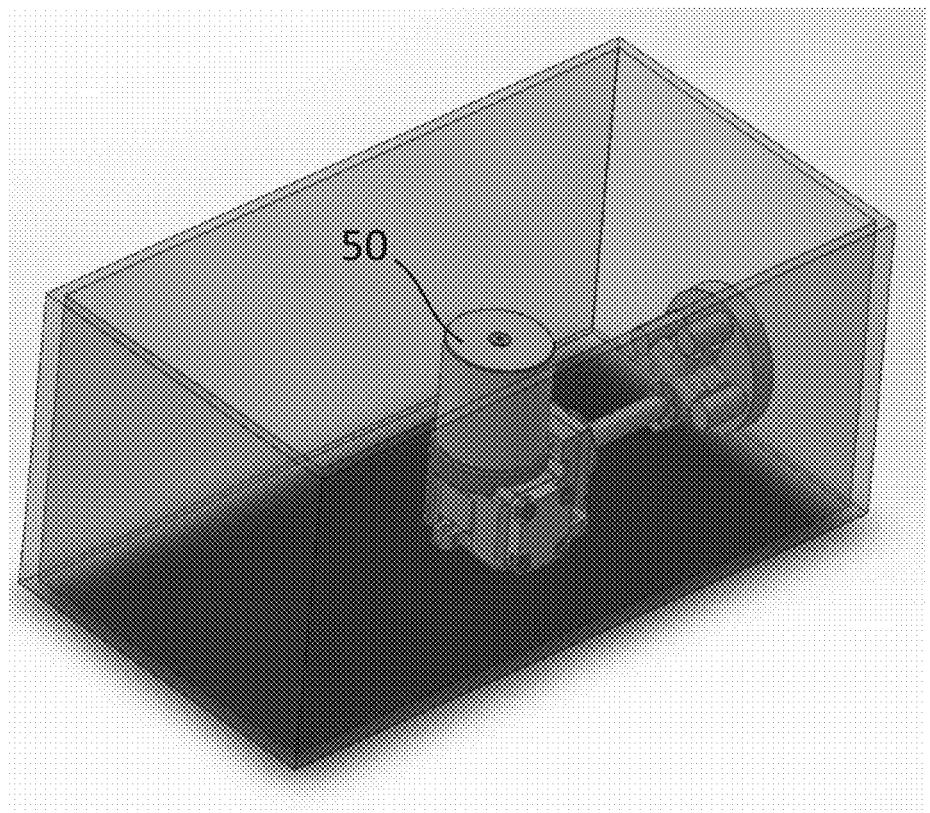
Figure 25:
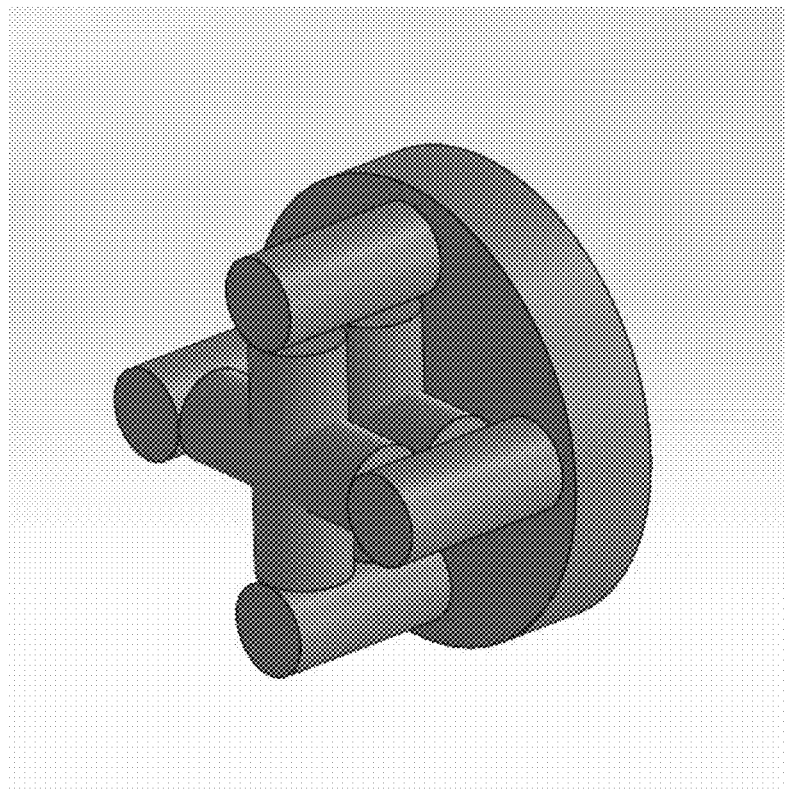
Figure 26:
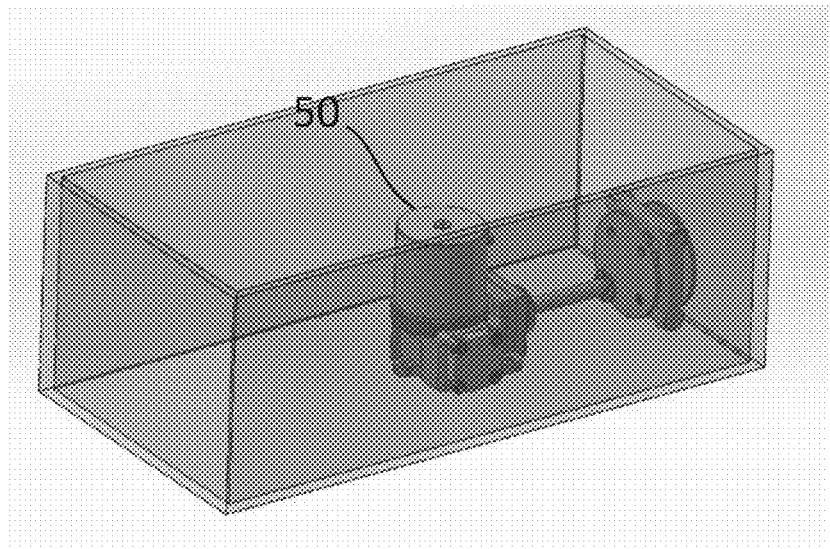
Figure 26:
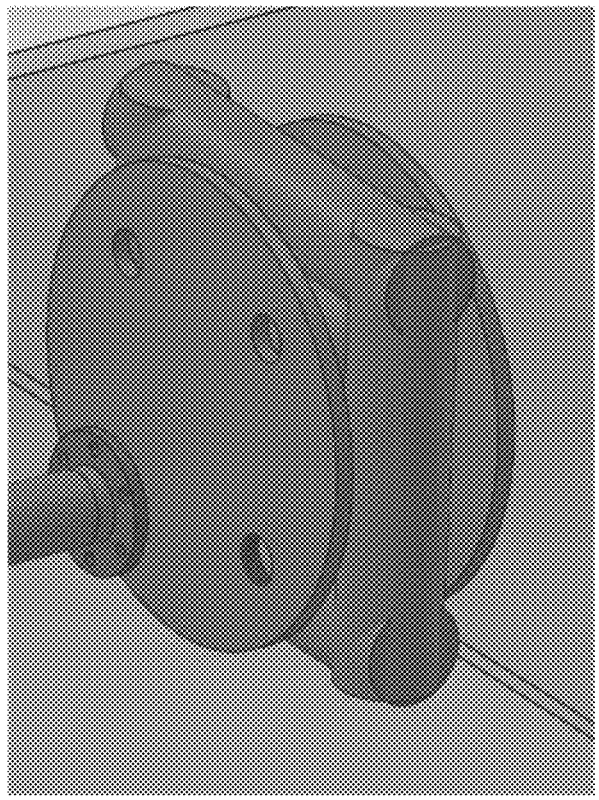
Figure 27:
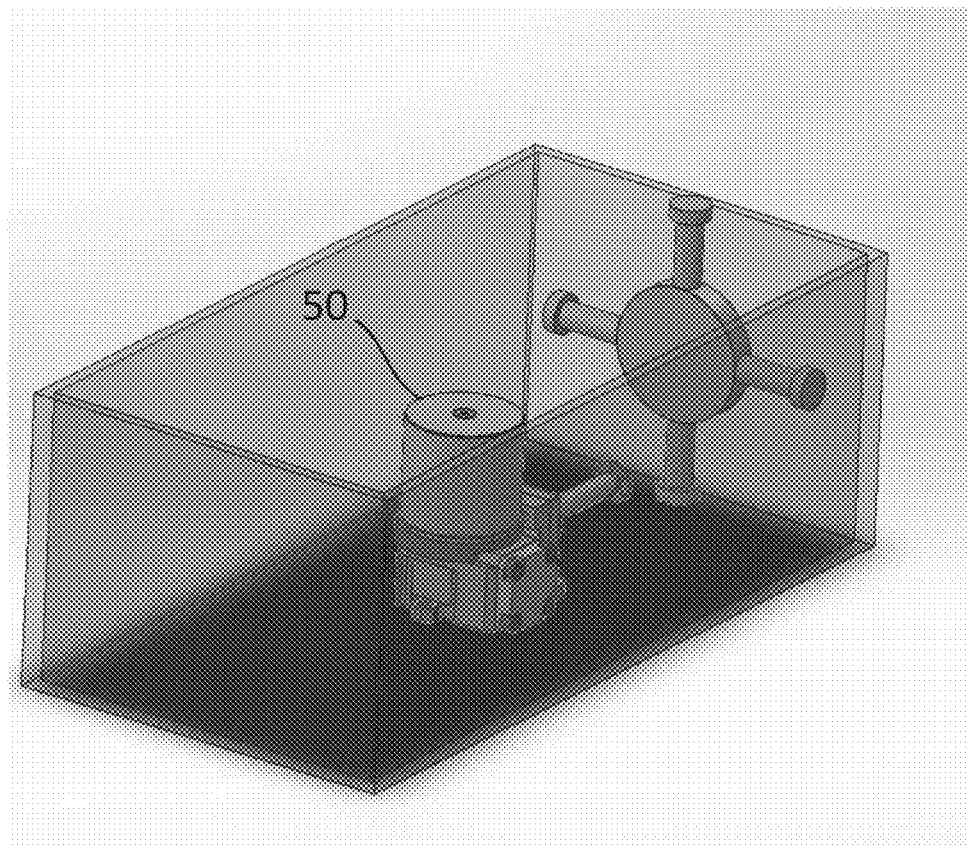
Figure 27:
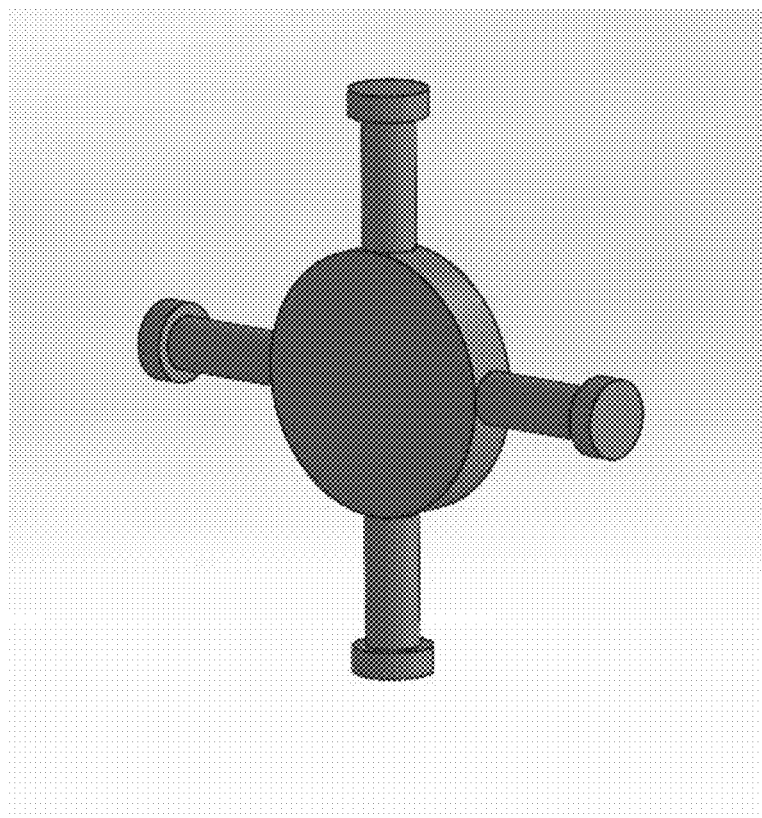
Figure 28:
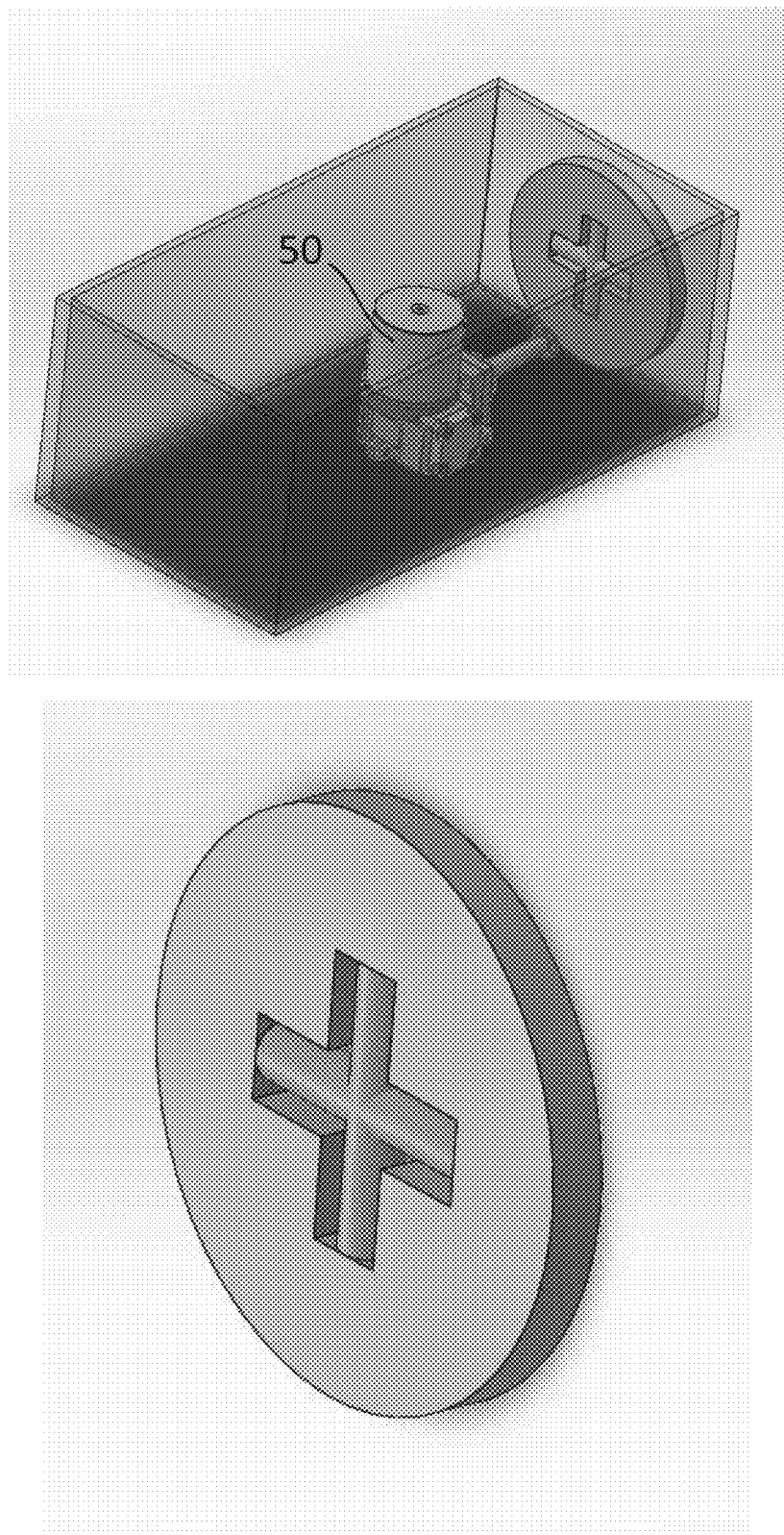
Figure 29:
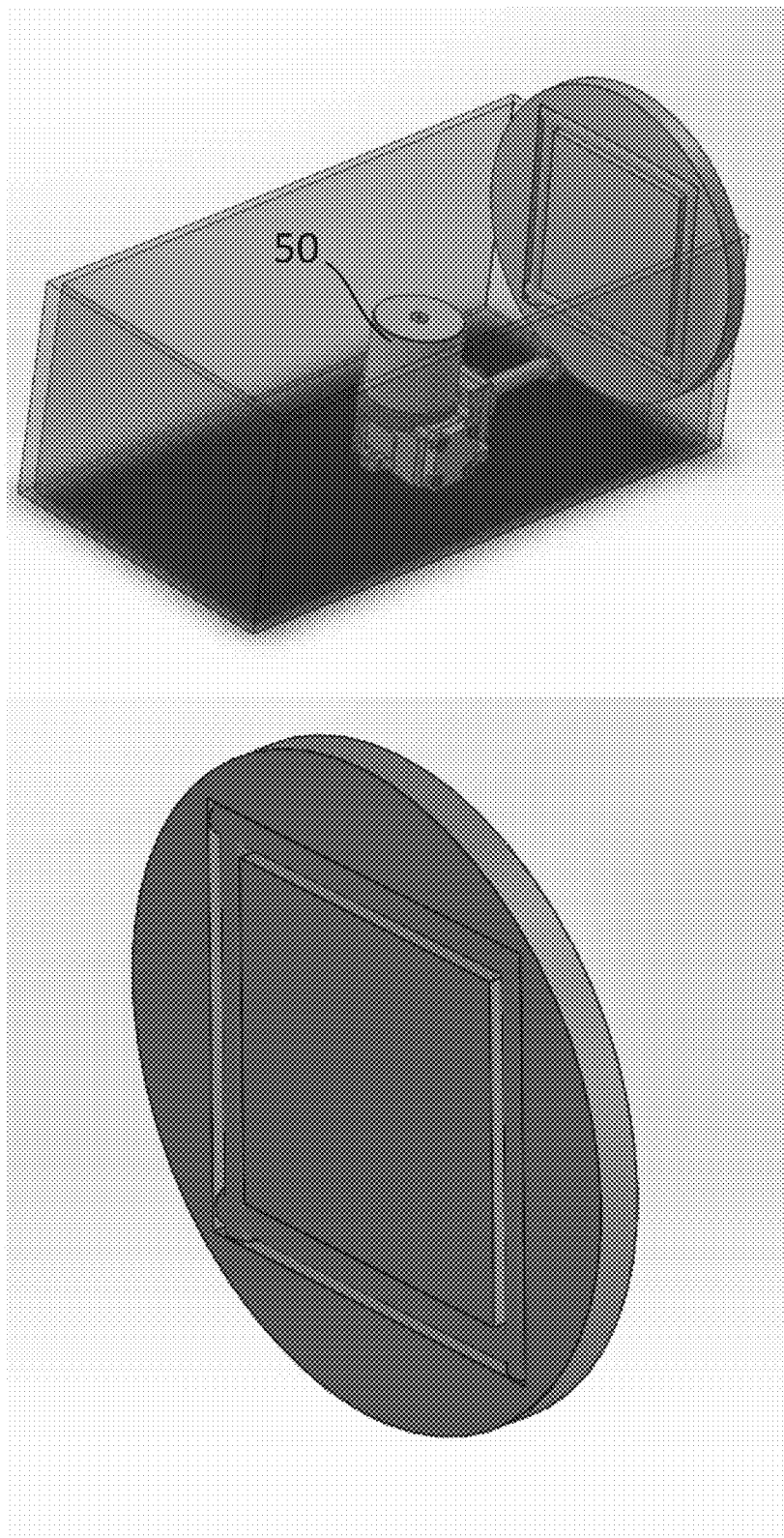
Figure 30:
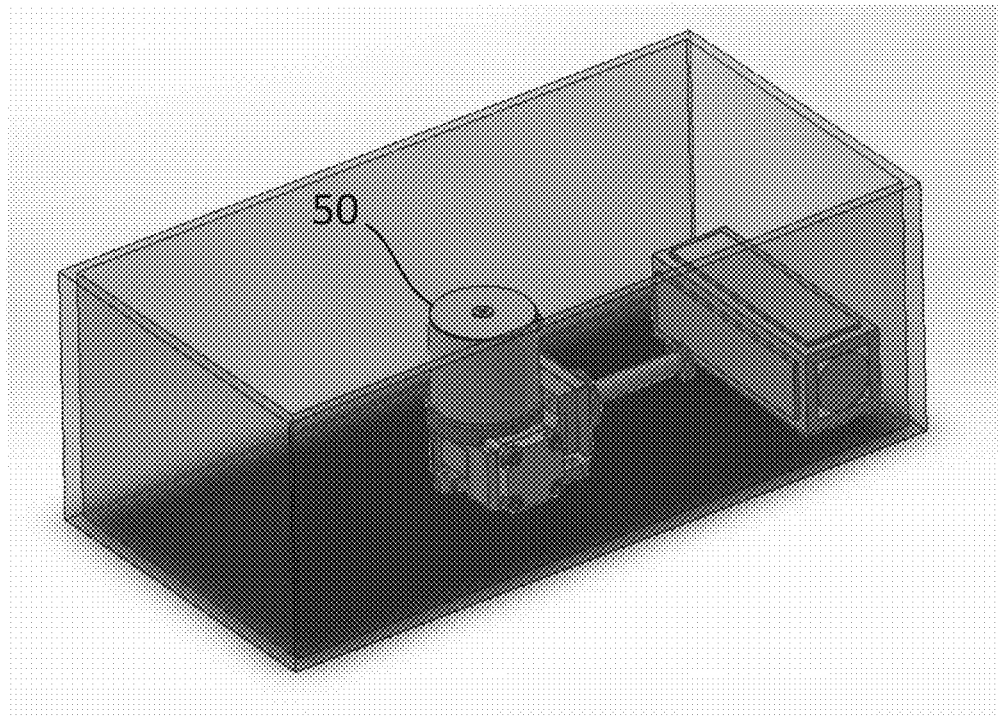
Figure 30:
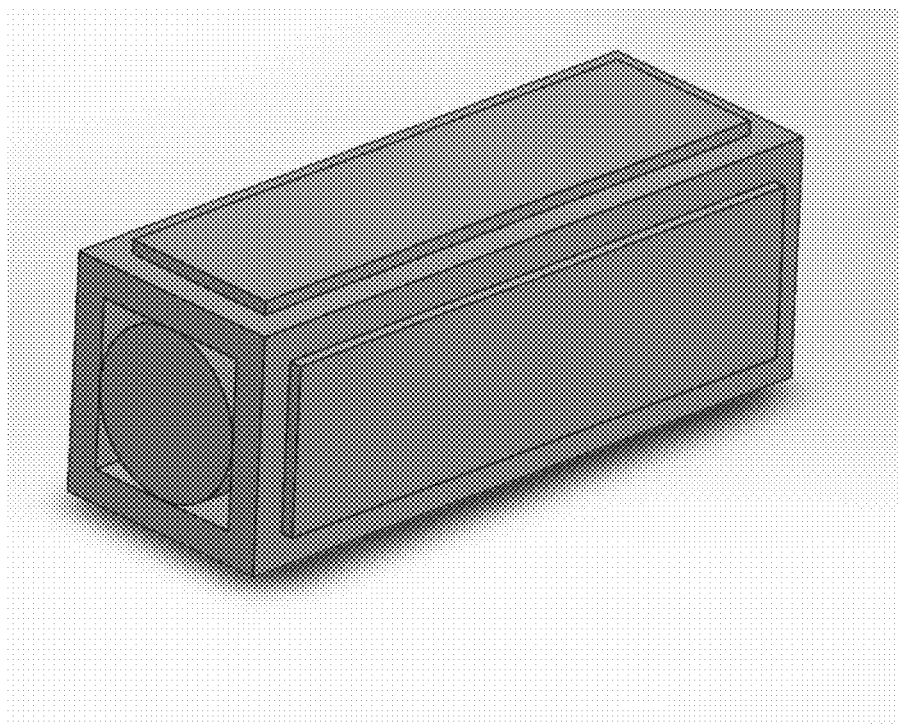
Figure 31:
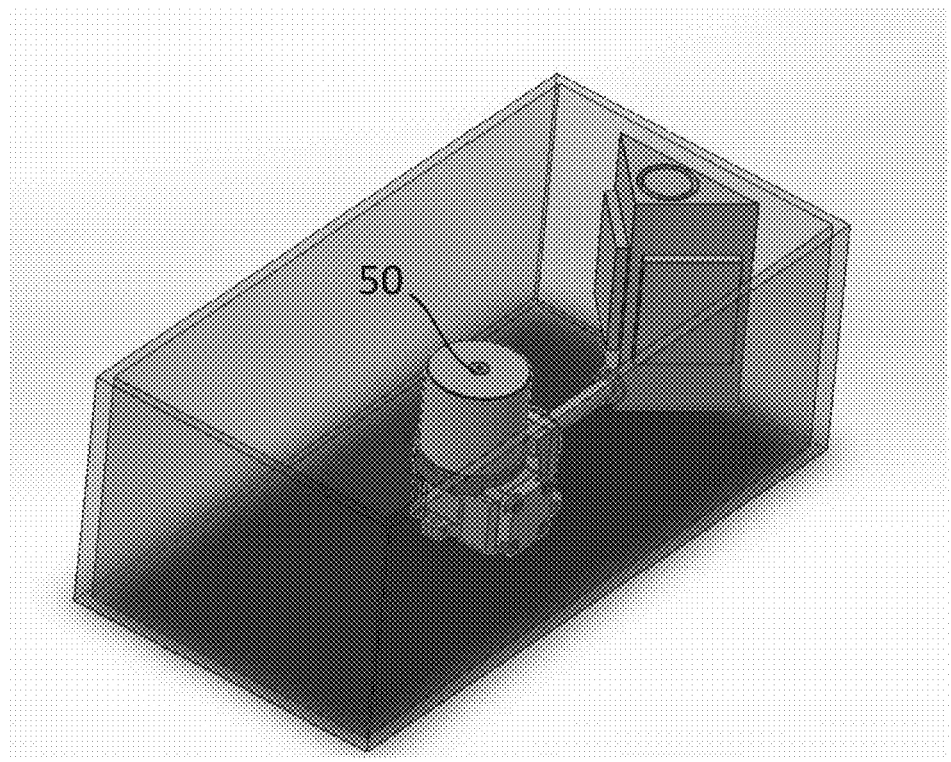
Figure 31:
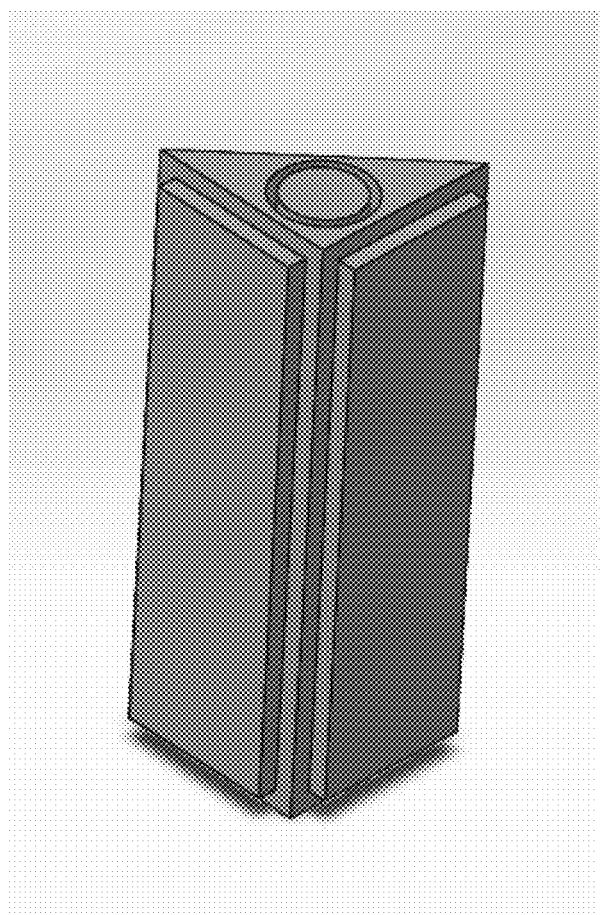

FIG. 18 shows a design with three orthogonally arranged copper sheets with a circular pancake electromagnet mounted to each.

FIGS. 19-27 show various hybrid designs that utilise both rods and pancake style electromagnets in multiple combinations and spatial arrangements.

FIGS. 28-31 show further designs wherein rod shaped electromagnets are provided within a volume defined by one or more surrounding pancake electromagnets.

Figure 32:
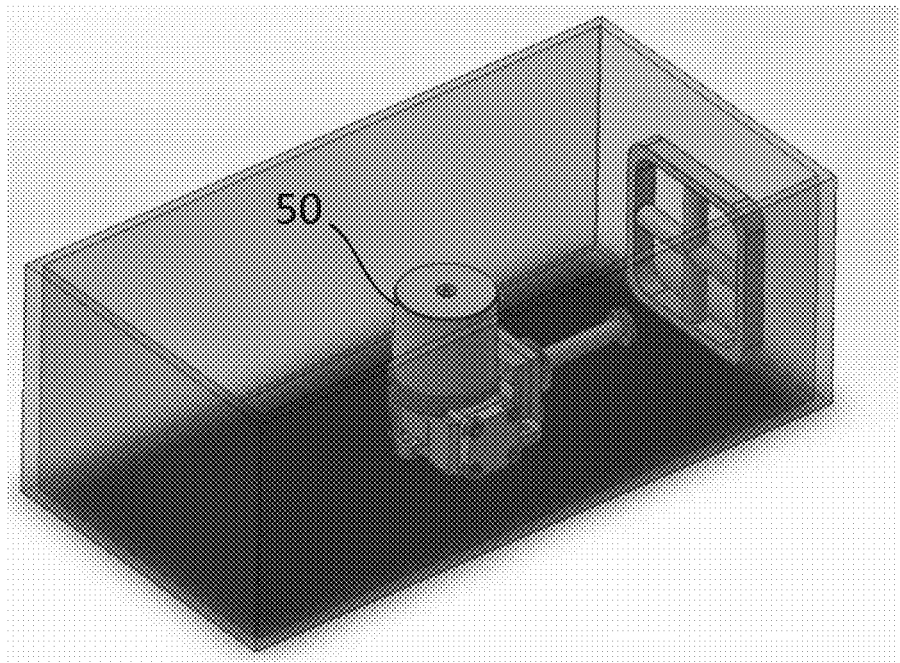
Figure 32:
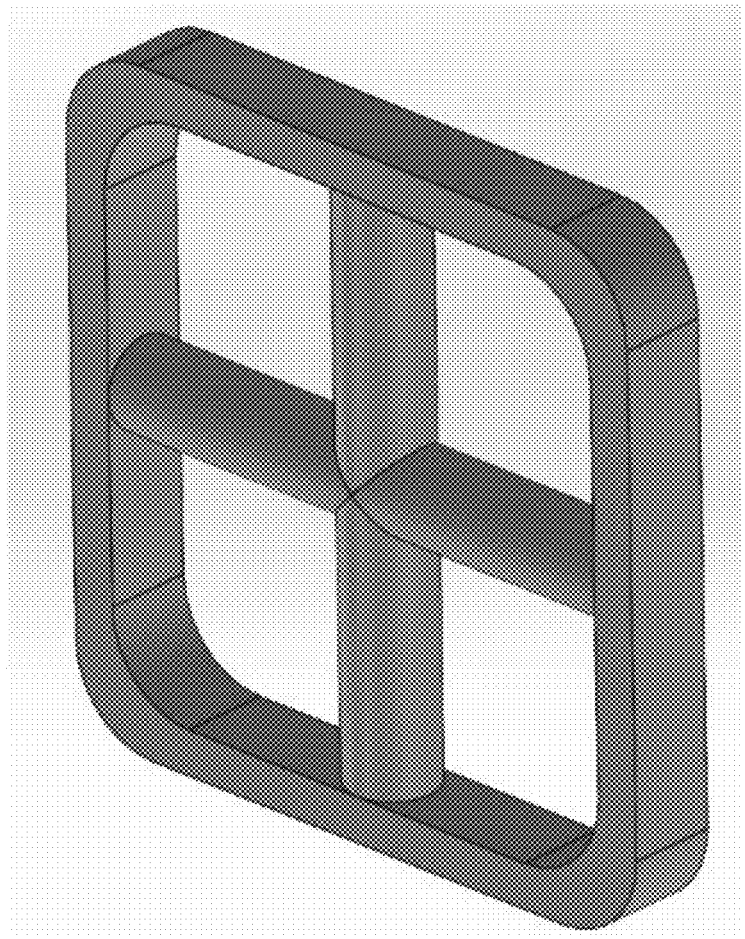
Figure 33:
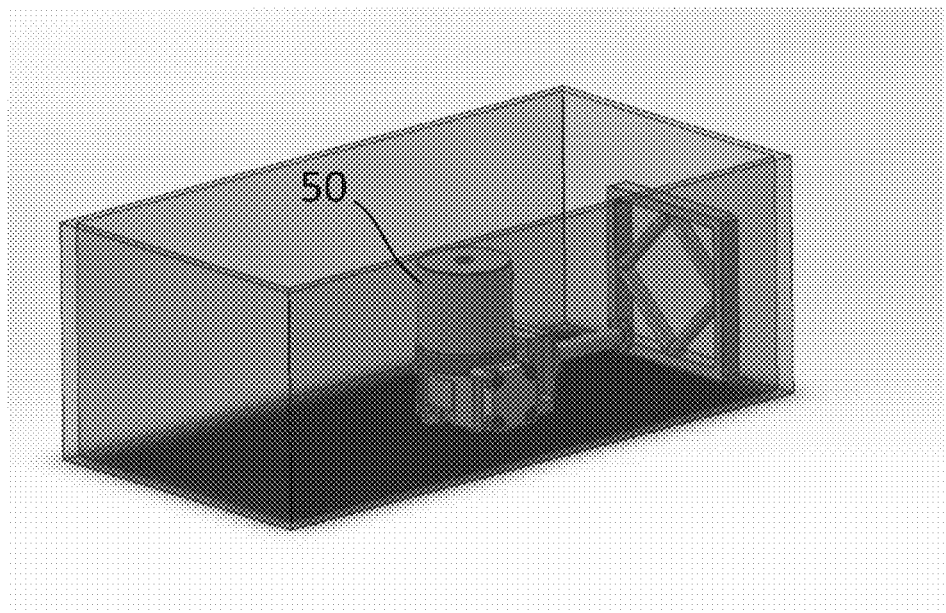
Figure 33:
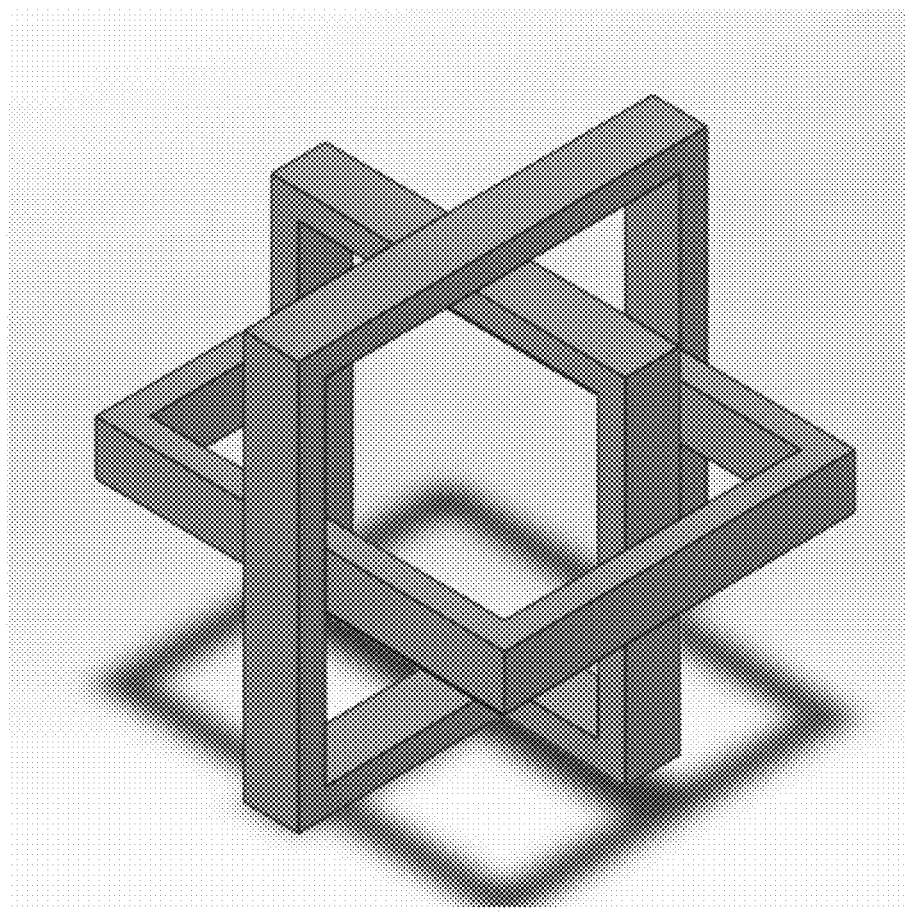
Figure 34:
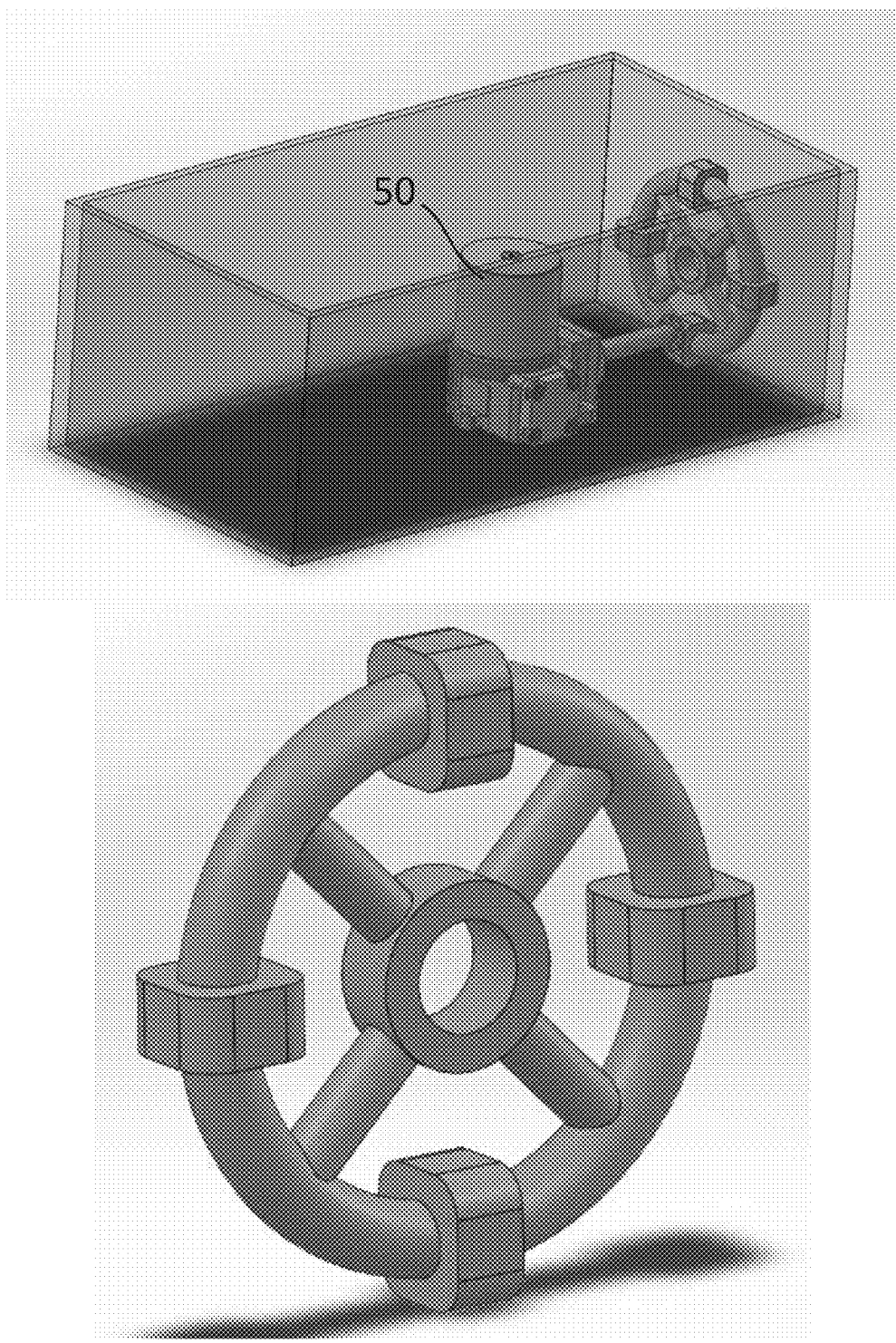

FIGS. 32-34 show configurations of rod and ring-shaped electromagnets for providing a magnetic field in three axis.

Figure 35:
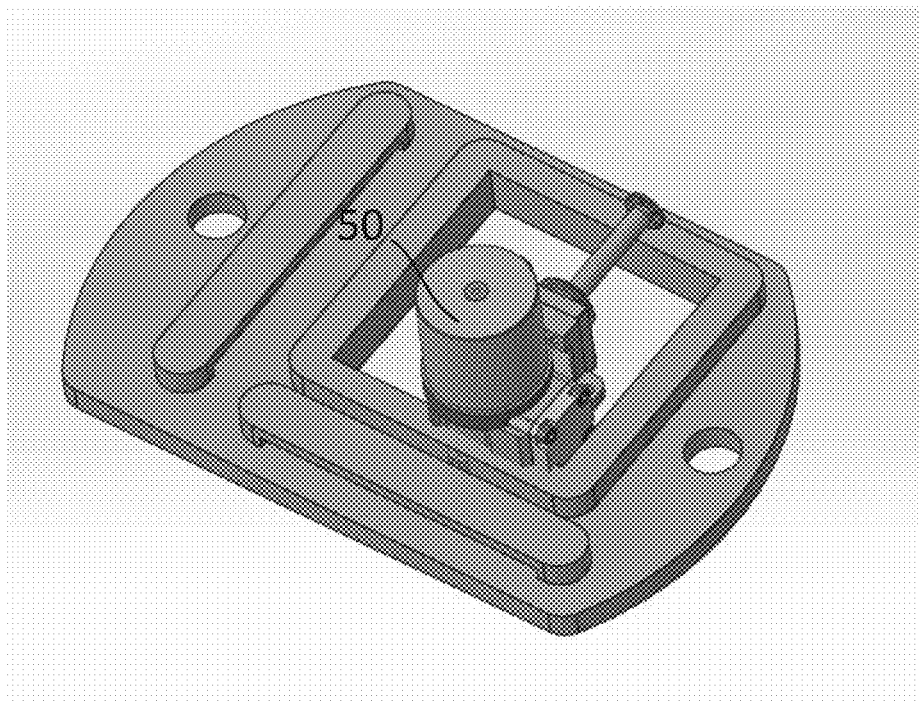
Figure 35:
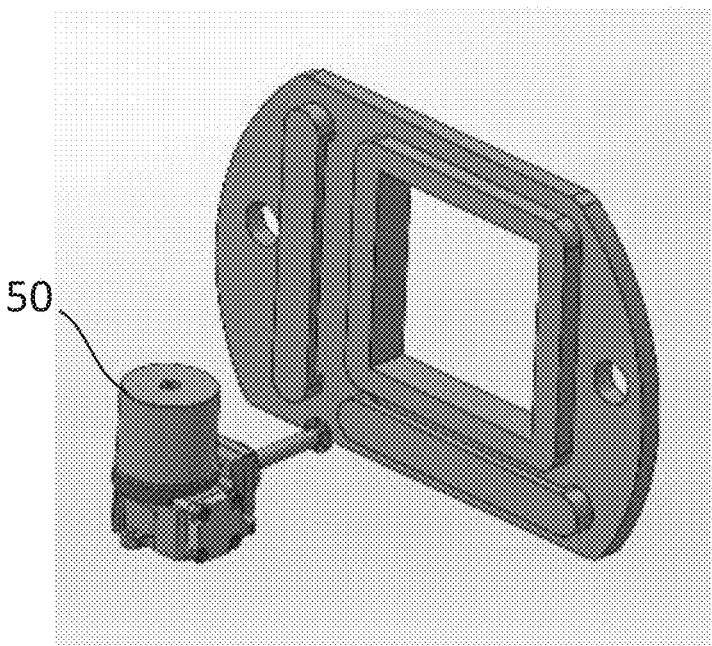

FIG. 35 shows an alternative configuration in which each of the magnetic components are provided in the same plane, with two orthogonal rectangular bars extruding out of a base plate, and a rectangular frame extrusion around which a HTS coil is wound. The cryocooler 50 is mounted within the footprint of the rectangular frame.

Figure 36:
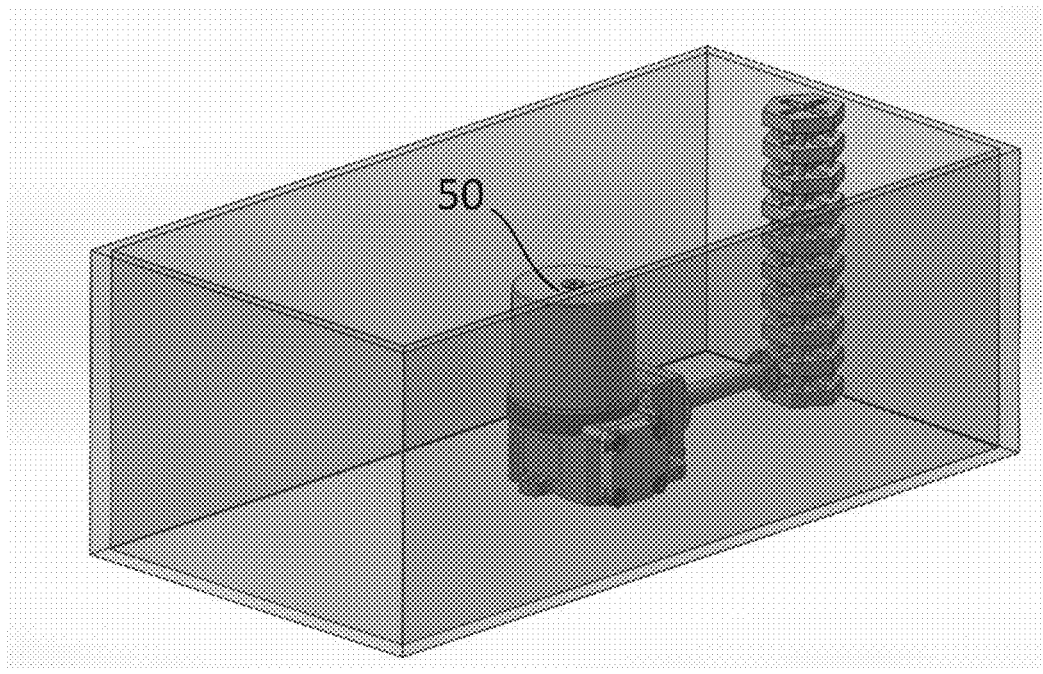
Figure 36:
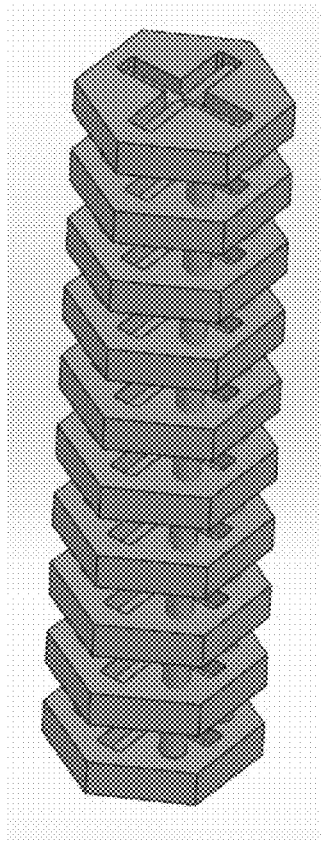

FIG. 36 shows a stackable 3 axis magnetic structure. Each hexagon piece consists of two rods in a cross configuration, whilst a HTS coil is wound around the periphery of each hexagon.

Figure 37:
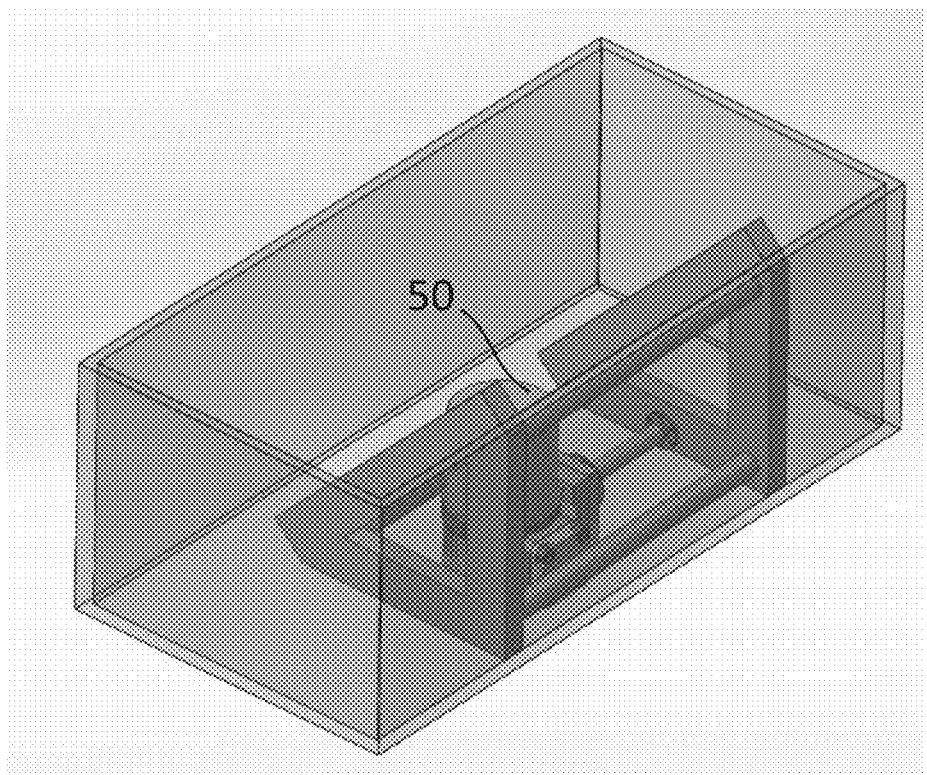
Figure 37:
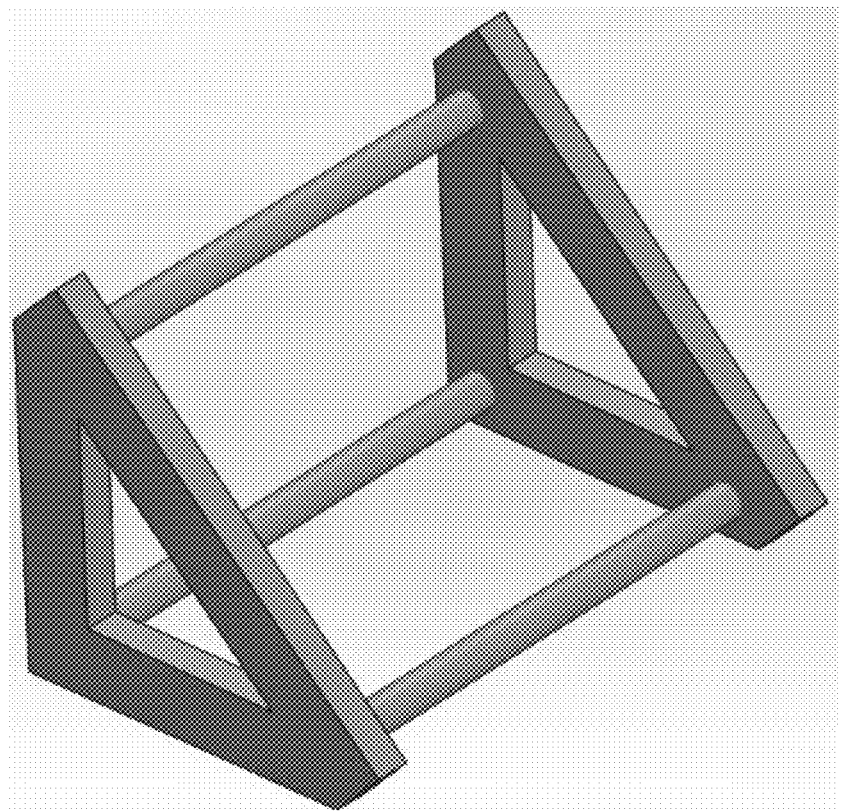

FIG. 37 shows an open frame structure which allows the cryocooler 50 to be mounted within the internal volume defined by the electromagnets.

Figure 38:
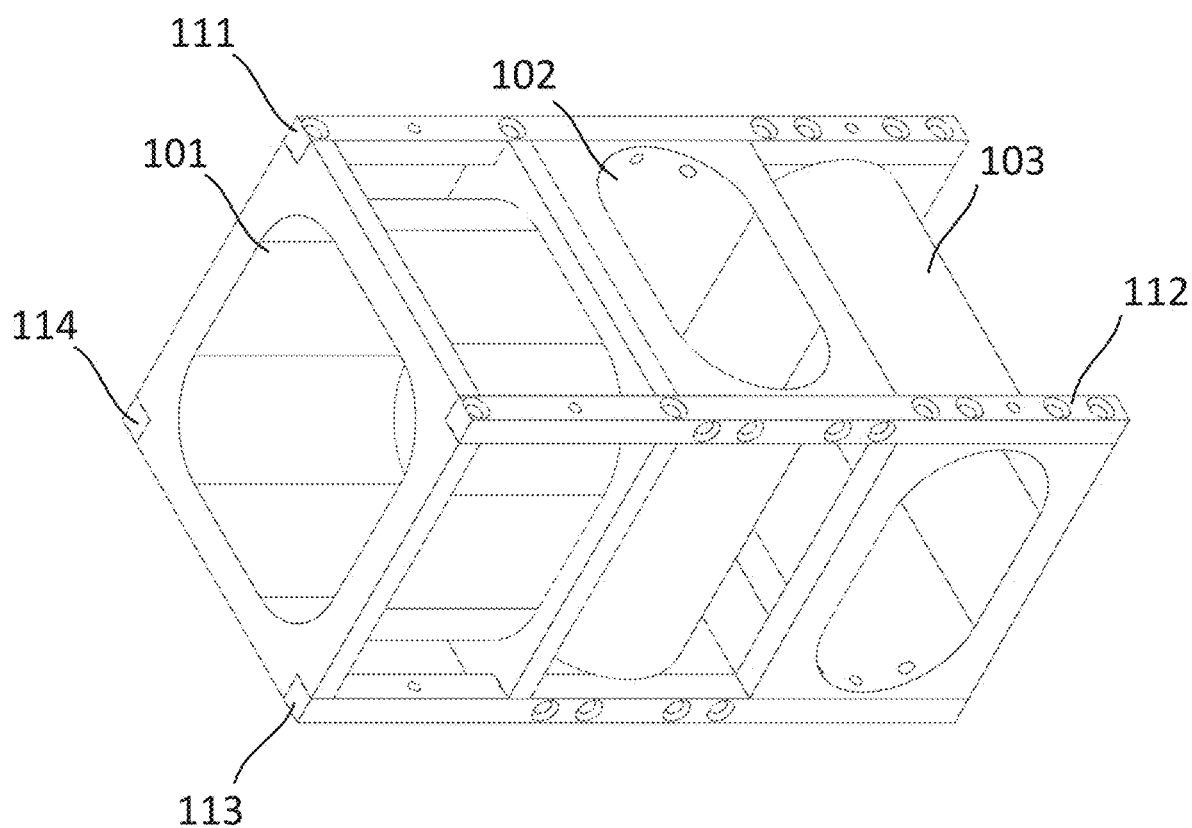

FIG. 38 depicts an embodiment in which three electromagnetic coils are arranged in a row and orientated such that the axis of all three coils are orthogonal to each other. Each of the coils is formed of electrically conducting wire or tape wound around a frame member (101, 102, 103) having an internal volume. In a particular embodiment the frame members are made of copper, allowing for rapid thermal transfer between the frame members and their respective coils. In an alternative embodiment the frame members are made of a non-thermally conducting space-grade plastic such as PEEK (polyetheretherketone) in order to aid thermal isolation of the electromagnetic coils and to reduce the overall thermal mass of the system 10. In further embodiments, the frame members are made of aluminium or graphene. The skilled person would understand that any suitable material may be used for the frame members however, including both ferromagnetic material (such as iron, nickel, and cobalt) or non-ferromagnetic material (such as plastic or ceramic).

As depicted, the left most frame member (101) has a larger internal radius and a shorter depth than the two frame members to its right (102, 103), reducing the overall length of the system 10. In an alternative embodiment, each of the frame members have substantially identical dimensions. Whilst the frame members are depicted as having a generally obround cross-section, the skilled person would appreciate that any suitably shaped frame members may be employed depending on the specific application of the system 10.

In an embodiment the coils are formed 2, 4, 6 or 10 mm wide HTS tape/wire. In a further embodiment each of the coils is dry-wound without inter-turn insulation. In an alternative embodiment, each of the coils is embedded in a matrix with insulation.

As shown, each of the frame members are connected by structural members such as cross rods (111, 112, 113, 114). In an embodiment the rods are made of a thermally conductive material such as copper, and are thermally insulated from their surround environment (by thermally insulating mountings, such as plastic bolts or any other suitable form of thermal break) thereby allowing the electromagnets to thermally equilibrate. In an embodiment the rods are actively cooled by one or more cooling elements (such as cryocooler 50) and are in thermal contact with each of the frame members and/or individual coils. In an embodiment, thermal contact to the coils is provided by one or more thermal linkages of the kind discussed above. In an alternative embodiment, the frame members and/or coils are cooled directly by the one or more cooling elements. In a particular embodiment, a cooling element extends through the internal volume of the left most frame member (101) of FIG. 38 and contacts a plate (not shown) situated between the left most and centre frame members (101, 102). This plate is formed of a thermally conductive material such as copper and allows the two frame members (101, 102) to be cooled by a single cooling element located within the internal volume of the frame members-thereby reducing the total mass and volume required for the system 10. In this embodiment, the right most frame member (103) can be cooled by the same single cooling element (via the rods or some other thermal linkage between itself and one or both of the other frame members and/or the cooling element. Alternatively, the right most frame member (103) is cooled by a dedicated cooling element.

Whilst not shown, the coils once cooled to a superconducting state are energised by one or more power sources such as the electromagnetic flux injection devices and contactless electromagnetic flux pumps discussed above. In a particular embodiment, a dedicated flux pump is provided for each electromagnet/coil.

Whilst the system described is envisaged for use in the orientation of a satellite or group of satellites relative to each other or another entity (i.e. attitude control), it may equally be used for altitude control or the orbital assembly of larger structures from individually position able components. Its operation is also not limited to space, and the described system may have terrestrial applications including but not limited to position control of drone vehicles. The system 10 and operational concepts described herein may also have applications in charged particle shielding, plasma manipulation, momentum exchange and eddy current induction.

Although the forgoing describes several embodiments of the present invention with reference to satellites, the forgoing may equally apply to any other suitable spacecraft(s) which is/are not necessarily satellites, and which use(es) a magnetic field for position control. In certain embodiments, the spacecraft and/or satellite(s) may be the one as described in International Publication number: WO 2020174378 A1 (PCT Application number: PCT/IB2020/051579), the entirety of which is herein incorporated by reference.

Where in the foregoing description reference has been made to elements or integers having known equivalents, then such equivalents are included as if they were individually set forth.

It will of course be realised that while the foregoing has been given by way of illustrative example(s) of the present invention, all such modifications and variations thereto as would be apparent to a person skilled in the art are deemed to fall within the broad scope and ambit of the various aspects if invention as is hereinbefore described and/or defined in the claims.

The invention claimed is:

1. A system for generating magnetic fields in one or more axis, the system comprising:
   a primary electromagnet comprising a first coil having a first axis wherein the first coil is formed of a superconductor,
   a cooling element configured to cool the first coil below the critical temperature of the superconductor,
   a power source configured to energise the primary electromagnet,
   wherein the primary electromagnet comprises a frame member, and
   wherein the frame member is suspended from at least one bracket by a thermally insulating structural member and/or a thermally insulating spring.

2. The system of claim 1 wherein the first coil and the cooling element are thermally insulated and/or thermally isolated from their ambient environment.

3. The system of claim 2 wherein the thermally insulating structural member is a cable and/or wherein the thermally insulating structural member is formed from one of metallic or non-metallic material including one or more of polymers, ceramics, composite, glass, Kevlar, stainless steel or quarts.

4. The system of claim 2 wherein the frame member is rectangular and suspended by thermally insulating structural members from four brackets, each bracket located towards and supporting a respective corner of the frame member.

5. The system of claim 2 wherein the bracket(s) include adjustable tensioning means for adjusting the tension of the insulating structural member.

6. The system of claim 5 wherein the adjustable tensioning means comprise a threaded spool about which an end portion of the insulating structural member is wound.

7. The system of claim 5 wherein the adjustable tensioning means comprise one or more of a spring-loaded pulley, pinion, roller and worm gear.

8. The system of claim 2 wherein the brackets include automatic tensioning means for maintaining the tension of the insulating structural member.

9. The system of claim 2 wherein the brackets are formed of a resiliently flexible material and are configured to provided tension to the insulating structural member by their resilience.

10. The system of claim 8 wherein the automatic tensioning means comprise a spring-loaded pulley.

11. The system of claim 2 wherein the bracket(s) are formed from metallic or non-metallic material including one or more of polymers, ceramics, glass, nylon, aluminium, titanium or PTFE.

12. The system of claim 2 further comprising a first secondary electromagnet mounted to the frame member comprising a second coil having a second axis wherein the second coil is formed of a superconductor,
wherein the first and second axis are non-parallel,
wherein the cooling element is further configured to cool the second coil below the critical temperature of the superconductor.

13. The system of claim 12 further comprising a second secondary electromagnet mounted to the frame member comprising a third coil having a third axis wherein the third coil is formed of a superconductor,
wherein the first, second and third axis are non-parallel,
wherein the cooling element is further configured to cool the third coil below the critical temperature of the superconductor.

14. The system of claim 13 wherein the first, second and third axis are orthogonal.

15. The system of claim 2 wherein the first coil is a pancake coil.

16. The system of claim 2 wherein the frame member has an inner and outer perimeter and the first coil is wound around the outer perimeter of the frame member.

17. The system of claim 6 wherein the secondary electromagnets are mounted within the inner perimeter of the frame member.

18. The system of claim 13 wherein the secondary electromagnets are each provided in the form of a solenoid.

19. The system of claim 13 further comprising insulating material arranged to reduce radiative heat transfer between the primary and secondary electromagnets and their surrounding environment.

20. The system of claim 19 wherein the insulating material is multi-layer insulation.

* * * * *